(12) United States Patent
Baker et al.

(10) Patent No.: US 8,192,161 B2
(45) Date of Patent: Jun. 5, 2012

(54) WIND TURBINE WITH DEPLOYABLE AIR DEFLECTORS

(75) Inventors: Jonathon P. Baker, Davis, CA (US); Kevin Lee Jackson, Winters, CA (US); Edward A. Mayda, Roseville, CA (US); Cornelis P. van Dam, Davis, CA (US)

(73) Assignee: Frontier Wind, LLC., West Conshohocken, PA (US)

( * ) Notice: Subject to any disclaimer, the term of this patent is extended or adjusted under 35 U.S.C. 154(b) by 377 days.

(21) Appl. No.: 12/464,447

(22) Filed: May 12, 2009

(65) Prior Publication Data

US 2009/0285682 A1   Nov. 19, 2009

Related U.S. Application Data

(63) Continuation-in-part of application No. 12/122,584, filed on May 16, 2008.

(51) Int. Cl.
*F03B 3/12* (2006.01)
(52) U.S. Cl. .......................................................... 416/23
(58) Field of Classification Search .................... 416/23, 416/33, 36, 40
See application file for complete search history.

(56) References Cited

U.S. PATENT DOCUMENTS

| | | | |
|---|---|---|---|
| 1,790,309 A | 1/1931 | Kientz | |
| 2,076,520 A | 4/1937 | Swanson | |
| 2,485,543 A | 10/1949 | Andreau | |
| 2,503,585 A | 4/1950 | Loedding | |
| 2,622,686 A | 12/1952 | Chevreau et al. | |
| 2,951,662 A | 9/1960 | Theodrosen | |
| 4,341,176 A | 7/1982 | Orrison | |
| 4,575,309 A | 3/1986 | Brown | |
| 4,582,278 A | 4/1986 | Ferguson | |
| 4,692,095 A | 9/1987 | Lawson-Tancred | |
| 5,106,265 A | 4/1992 | Holzem | |
| 5,181,678 A | 1/1993 | Widnall et al. | |

(Continued)

FOREIGN PATENT DOCUMENTS

GB   2185788 A   7/1987

(Continued)

OTHER PUBLICATIONS

US office action for U.S. Appl. No. 12/122,584 mailed Aug. 30, 2011.

(Continued)

*Primary Examiner* — Chandra Chaudhari
(74) *Attorney, Agent, or Firm* — Banner & Witcoff, Ltd.

(57) ABSTRACT

An apparatus and system for compensating for various load situations in a turbine includes the use of one or more deployable devices configured to extend an air deflector outwardly from a surface of a rotor blade. The air deflector may subsequently be retracted into the rotor blade once the load falls below a certain threshold. Mechanisms for extending and retracting the air deflector may include pneumatic, hydraulic and/or electromechanical devices. Air deflectors are generally configured to modify the air flow around the rotor blade to increase or decrease power generation, or reduce loads so that the risk of potential damage to components of the wind turbine is minimized. Deflectors may be positioned at various chordwise stations including leading-edge, mid-chord, and trailing-edge locations on the upper and lower surfaces at spanwise positions. Accordingly, a plurality of devices can be actuated to aerodynamically control rotor performance and loads based on wind conditions.

20 Claims, 29 Drawing Sheets

U.S. PATENT DOCUMENTS

| | | | |
|---|---|---|---|
| 5,433,404 A | 7/1995 | Ashill et al. | |
| 5,456,579 A | 10/1995 | Olson | |
| 5,527,152 A | 6/1996 | Coleman et al. | |
| 5,531,407 A | 7/1996 | Austin et al. | |
| 6,010,098 A | 1/2000 | Campanile et al. | |
| 6,045,096 A | 4/2000 | Rinn et al. | |
| 6,149,105 A | 11/2000 | Jaggard | |
| 6,465,902 B1 | 10/2002 | Beauchamp et al. | |
| 6,619,918 B1 | 9/2003 | Rebsdorf | |
| 6,902,370 B2 | 6/2005 | Dawson et al. | |
| 6,940,185 B2 | 9/2005 | Andersen et al. | |
| 7,028,954 B2 | 4/2006 | Van Dam et al. | |
| 7,029,235 B2 * | 4/2006 | Liang | 416/92 |
| 7,192,245 B2 * | 3/2007 | Djeridane et al. | 415/115 |
| 7,204,674 B2 | 4/2007 | Wobben | |
| 7,293,959 B2 | 11/2007 | Pedersen et al. | |
| 7,387,491 B2 | 6/2008 | Saddoughi et al. | |
| 7,419,356 B2 | 9/2008 | Stiesdal | |
| 2002/0074459 A1 | 6/2002 | Gleine et al. | |
| 2003/0218102 A1 | 11/2003 | Van Dam Cornelis et al. | |
| 2003/0223868 A1 | 12/2003 | Dawson et al. | |
| 2006/0145483 A1 | 7/2006 | Larsen et al. | |
| 2008/0240923 A1 | 10/2008 | Bonnet | |
| 2008/0292461 A1 | 11/2008 | Stiesdal | |
| 2009/0285682 A1 | 11/2009 | Baker et al. | |
| 2011/0223022 A1 | 9/2011 | Wang et al. | |

FOREIGN PATENT DOCUMENTS

| | | |
|---|---|---|
| WO | 0229247 A1 | 4/2002 |
| WO | 2004099608 A1 | 11/2004 |
| WO | 2007045940 A1 | 4/2007 |

OTHER PUBLICATIONS

Final office action in U.S. Appl. No. 12/122,584 mailed Feb. 21, 2012.

Extended European Search Report for application No. 09251327.4 mailed Mar. 27, 2012.

* cited by examiner

WIND TURBINE WITH DEPLOYABLE AIR DEFLECTORS

CROSS-REFERENCE TO RELATED APPLICATIONS

This application is a continuation-in-part of U.S. application Ser. No. 12/122,584, entitled "WIND TURBINE WITH GUST COMPENSATING AIR DEFLECTOR" and filed on May 16, 2008, the content of which is incorporated herein by reference in its entirety.

TECHNICAL FIELD

The invention relates generally to the design and control of a wind turbine. More specifically, the invention relates to modifying the aerodynamics of a wind turbine blade.

BACKGROUND

Wind turbines create power proportional to the swept area of their blades. The choice of rotor attributes for a wind turbine, such as its diameter, is a design trade-off between longer blades for more energy production in low winds and shorter blades for load limitation in high winds. Thus, wind turbine having longer blades will increase the swept area, which in turn produces more power. However, at high wind speeds, a wind turbine having longer blades places greater demands on the components and creates more situations where the turbine must be shut down to avoid damaging components. Even in situations where the average wind speed is not high enough to cause damage, periodic wind gusts which change both the speed and direction of the wind, apply forces that may be strong enough to damage equipment.

Approaches with varying levels of success have been attempted in achieving higher power, fewer shut downs, and less instances of damage to components. For example, pitch control has been used to vary the pitch of the blade (i.e., the angle of the blade). On a pitch controlled wind turbine, an electronic controller on the turbine checks the power output of the turbine. When the power output exceeds a certain threshold, the blade pitch mechanism turns the rotor blades to reduce the loads on the rotor blades. The blades are later turned back when the wind drops again. However, pitch control can be fairly slow to respond to changes in the wind and is relatively ineffective to loads imparted by sudden wind gusts.

Stall control is another approach that has been used in an attempt to achieve higher power, and to reduce shut downs and damage to components. In passive-type stall controlled wind turbines, the rotor blades are mounted to the hub at a fixed angular orientation. The stall control is achieved passively by the shape of the blade being such that the blade goes into aerodynamic stall (destroying lift) when the wind speed exceeds a certain threshold. Active-type stall controlled wind turbines exist. In such systems, the rotor blades are adjusted in order to create stall along the blade. However, both types of stall control systems can be difficult to optimize and slow to respond, and may suffer from lower predictability of results than desired. These drawbacks are magnified in conditions with erratic winds and wind gusts.

Variable length rotor blade systems have also been used as an attempt to achieve higher power, and experience fewer shut downs and less damage to components. In such systems, the wind turbine rotor blades are telescopic so that their length can be adjusted based on the wind speed. Such provides advantages in that the rotor blades can be extended to provide higher output in low wind conditions and retracted to lower loads in high wind conditions. U.S. Pat. No. 6,902,370 discloses a wind turbine system having telescoping wind turbine rotor blades. While variable length rotor blade systems have certain advantages, they may suffer drawbacks in erratic wind conditions or may be too slow to respond when experiencing a wind gust.

As electricity continues to become a more valuable commodity, and as wind turbines present an environmentally-friendly solution to solve electricity shortage problems, a wind turbine design that overcomes the aforementioned drawbacks and provide increased power and decreased turbine shut downs and damage to components is thus desirable.

BRIEF SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to a device and system for counteracting sudden increases in load or changes in operating environment such as when a gust suddenly increases the magnitude of the wind or changes the direction of the wind experienced by a wind turbine rotor.

A first aspect of the invention provides a wind turbine including an airfoil rotor blade having an air deflector. The air deflector may be configured to extend from an exterior surface of the airfoil rotor blade when a change in load or wind gust magnitude or angle is detected. In this way, the air deflector acts to counteract such changes. In one arrangement, the air deflector may be located on a leading side of the airfoil rotor blade as defined by a leading edge and a trailing edge of the blade. For example, the leading edge and surface may correspond to an edge or surface of the airfoil rotor blade closest to an origin of the wind. The air deflector may further be moved to a retracted position in normal operating conditions (e.g., when a load is not excessive) such that the air deflector does not extend outwardly from the surface of the airfoil rotor blade.

A second aspect of the invention provides a wind turbine including an airfoil rotor blade that is telescopically extendable and having at least one air deflector. To counteract excessive loads and other environmental factors, the airfoil rotor blade may be extended or retracted in conjunction with the extension or retraction of at least one air deflector. For example, when a sudden change occurs, the air deflector may be activated since the air deflector may be extended very quickly. For more gradual changes, extension or retraction of the blade may be used since quick compensation is not as critical. In other arrangements, the air deflector may be extended to further reduce loads in cases where the airfoil rotor blade has been retracted as much as possible.

A third aspect of the invention provides a wind gust or load counteracting module connected to an airfoil blade. The counteracting module may include an air deflector, a controller for controlling the extension and retraction of the air deflector and a sensor configured to sense various conditions. In one or more configurations, an airfoil blade may include multiple counteracting modules, each including an air deflector, a controller and a sensor. Use of modules may facilitate the removal, insertion or replacement of air deflectors or other components associated therewith out having to modify the entire airfoil blade.

According to one or more additional aspects, a rotor blade may include a plurality of air deflectors, each of which may be selectively and independently controlled. Various air deflectors or combinations thereof may be deployed depending on a given control requirement such as reduction in load, extension of blades, reduction in a pitch duty cycle, reduction of asymmetric loads, edgewise resonance damping and emergency stopping. In one or more arrangements, air deflectors may be categorized into six regions of a rotor blade: upper surface leading edge, upper surface mid chord, upper surface trailing edge, lower surface leading edge, lower surface mid chord and lower surface trailing edge. In one example, each region of air deflectors may be controlled as a single unit. Alternatively, each air deflector may be deployed independently of all others.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Aspects of the present invention are directed to a deployable device and combinations of its attributes that may be mounted to a rotor blade in various applications to quickly assist in counteracting wind gusts. In addition, aspects of the present invention are directed to a rotor blade having the deployable device, and to a wind turbine with a rotor blade having the deployable device.

Figure 1:
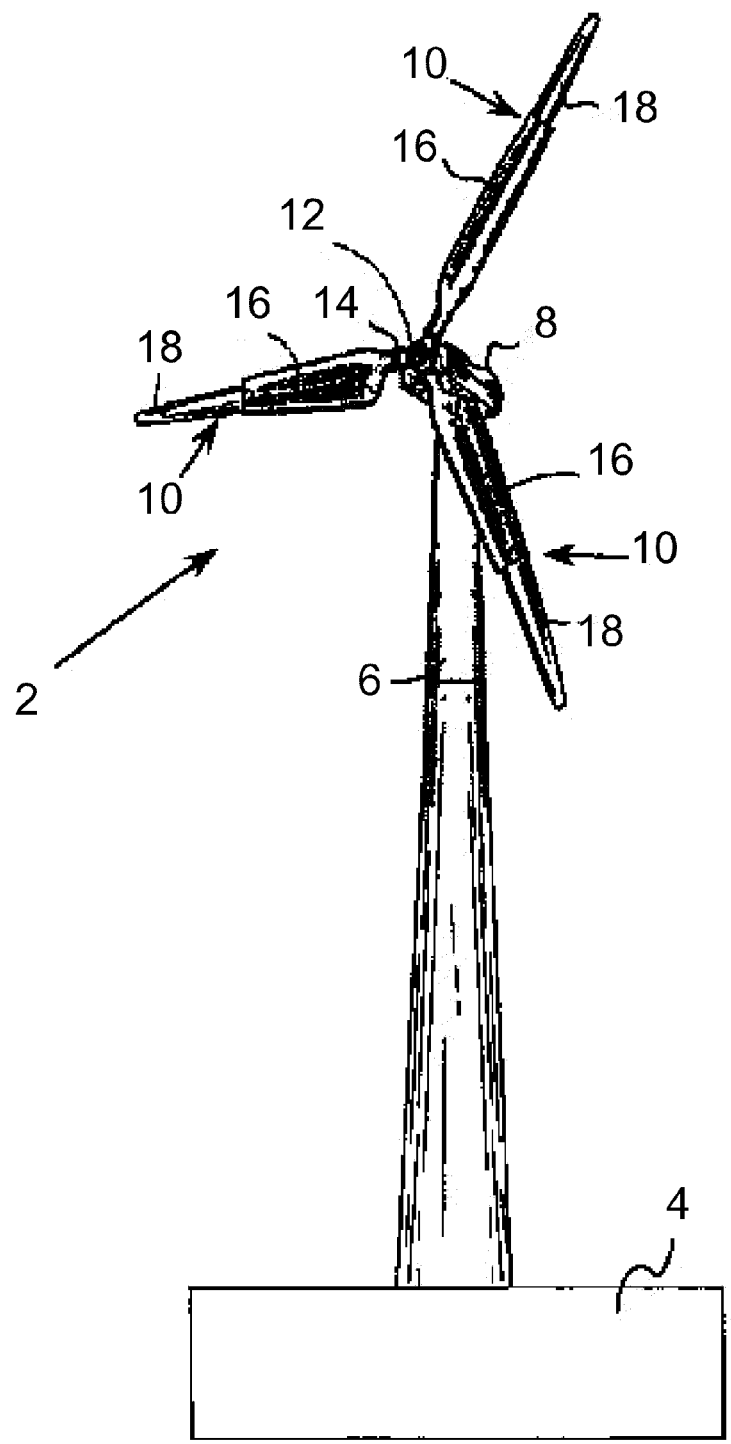
FIG. 1 is a perspective view of a wind turbine according to a first embodiment of the invention.

FIG. 1 shows a wind turbine 2 on a foundation 4 with a tower 6 supporting a nacelle 8. One or more blades 10 are attached to a hub 12 via a bolt flange 14. In the depicted embodiment, the wind turbine includes three blades 10. The hub 12 is connected to a gear box, a generator, and other components within the nacelle 8. The blades 10 may have a fixed length or may be of the variable length-type, i.e., telescopic, such as shown in FIG. 1. As shown in FIG. 1, each variable length blade 10 includes a root or base portion 16 and a tip portion 18. The tip portion 18 is movable with respect to the root portion 16 so as to controllably increase and decrease the length of the rotor blade 10, and in turn, respectively increase and decrease the swept area of the rotor blades 10. Any desirable drive system, such as a screw drive, a piston/cylinder, or a pulley/winch arrangement may be used to move the tip portion 18 with respect to the root portion 16. Such drive systems are described in U.S. Pat. No. 6,902,370, which is hereby incorporated by reference. The wind turbine 2 further includes a yaw drive and a yaw motor, not shown.

FIGS. 2-5 show a cross section of a wind turbine blade 10 containing at least one gust counteracting device 30. The blade 10 has a leading edge 20, a trailing edge 22, a high pressure side 24 and a low pressure side 26. A chord line c can be defined as a line between the leading edge 20 and trailing edge 22 of the blade 10. It is recognized that the leading side of the rotor blade 10 corresponds to the leading half of the rotor blade 10 and the trailing side of the rotor blade 10 to the trailing half of the rotor blade 10.

The blade 10 depicted in the figures is merely one illustrative cross-sectional design and it is recognized that infinite cross-sectional variations can be used as part of the present invention. The airfoil rotor blade may be made of any suitable construction and materials, such as fiberglass and/or carbon fiber.

Figure 2:
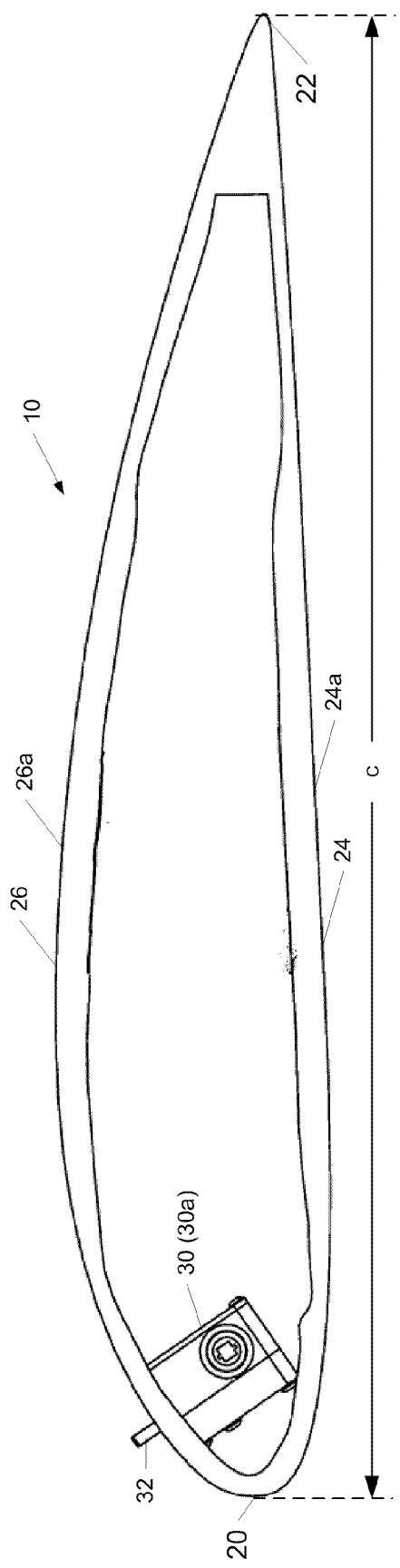
FIG. 2 is a cross-section through the rotor blade depicting a first wind gust counteracting device with the air deflector in an extended position.
Figure 3:
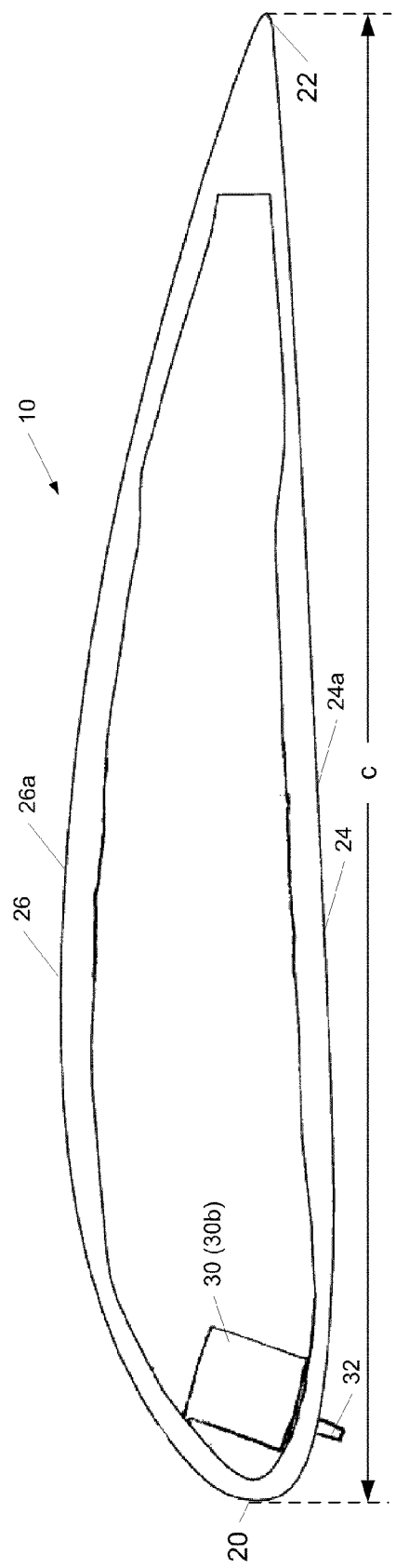
FIG. 3 is a cross-section through the rotor blade depicting a second wind gust counteracting device with the air deflector in an extended position.

As can be seen in cross sections of FIGS. 2 and 3, the rotor blade 10 further includes at least one gust counteracting device, generically referenced to as reference number 30, but specifically referred to as reference number 30a and 30b with reference to a specific side of the rotor blade 10. FIG. 2 depicts a placement of a first wind gust counteracting device 30a to affect the airflow on the low pressure side 26 of the rotor blade 10. FIG. 3 depicts a placement of a second wind gust counteracting device 30b to affect the airflow on the high pressure side 24 of the rotor blade 10. It is recognized that in use, the more curved surface 26a and the opposing less curved surface 24a create the dynamics of the low pressure side 26 and the high pressure side 24 due to well known principles of aerodynamics. This, in combination with the airflow over the rotor blade 10, creates an effect known as "lift" that assists in the rotation of the rotor.

In one embodiment, each rotor blade 10 includes at least one first wind gust counteracting device 30a to affect the airflow on the low pressure side 26 and at least one second wind gust counteracting device 30b to affect the airflow on the high pressure side 24. That is, it includes wind gust counteracting devices 30a and 30b, and these devices 30a, 30b may be longitudinally spaced along the rotor blade 10. Any desired number of these devices 30a, 30b may be used. In another embodiment, each rotor blade 10 includes at least one wind gust counteracting device 30a to affect the airflow on the low pressure side 26 and no wind gust counteracting devices on the high pressure side 24. Any desired number of the devices 30a may be used on the low pressure side 26. In yet another embodiment, each rotor blade 10 includes at least one wind gust counteracting device 30b on the high pressure side 24 and no wind gust counteracting devices on the low pressure side 26. Any desired number of the devices 30b may be used on the high pressure side 24.

Figure 4:
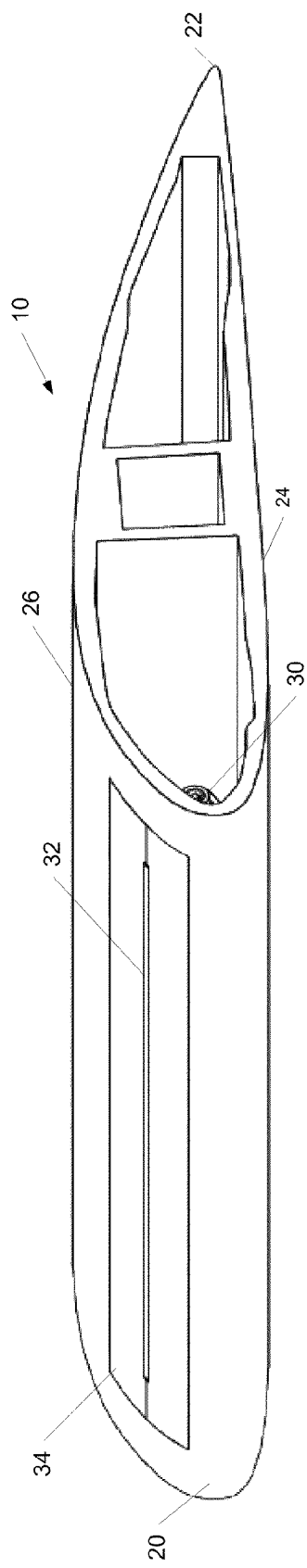
FIGS. 4 and 5 are an isometric sectional views through the rotor blade depicting the wind gust counteracting device of FIG. 2 with the air deflector in a retracted position (FIG. 4) and in an extended position (FIG. 5).

Each wind gust counteracting device 30a, 30b includes an air deflector 32. The air deflector 32 is movable between an extended position in which the air deflector 32 extends from an exterior surface of the airfoil rotor blade 10 and a retracted position in which the air deflector 32 is substantially flush with, recessed, or otherwise does not materially extend from the exterior surface of the airfoil rotor blade 10. FIGS. 2 and 3 both show the air deflector 32 in an extended position wherein the air deflector 32 extends from the exterior surface of the rotor blade 10. FIG. 4 is an isometric sectional view through the rotor blade 10 depicting the wind gust counteracting device 30a.

In a first arrangement, the location of the air deflectors 32 with respect to the leading edge 20 and the trailing edge 22 of the airfoil rotor blade 26 is in the leading half, i.e., is between 0%-50% of the length of the chord c when measured perpendicularly thereto from the leading edge 20 to the trailing edge 22. In another arrangement, the location of the air deflectors 32 with respect to the leading edge 20 and the trailing edge 22 of the airfoil rotor blade 26 is between 5%-25% of the length of the chord c when measured perpendicularly thereto from the leading edge 20 to the trailing edge 22. In yet another arrangement, the location of the air deflectors 32 with respect to the leading edge 20 and the trailing edge 22 of the airfoil rotor blade 26 is between 5%-15% of the length of the chord c when measured perpendicularly thereto from the leading edge 20 to the trailing edge 22.

The air deflector 32 may be sized based on the desired wind turbine condition parameter and further in view of the number of gust counteracting devices used. The air deflector may be made from any suitable material, such as fiberglass, carbon fiber, stainless steel, and/or aluminum. The air deflector 32 may be of any desired width, for example from a few inches to a foot. Additionally, air deflector 32 may extend from the airfoil surface to any desired height, e.g., from less than a percent to a few percent of the chord c (FIG. 3), and they may have any suitable thickness based on the material chosen, typically less than one inch.

Figure 5:
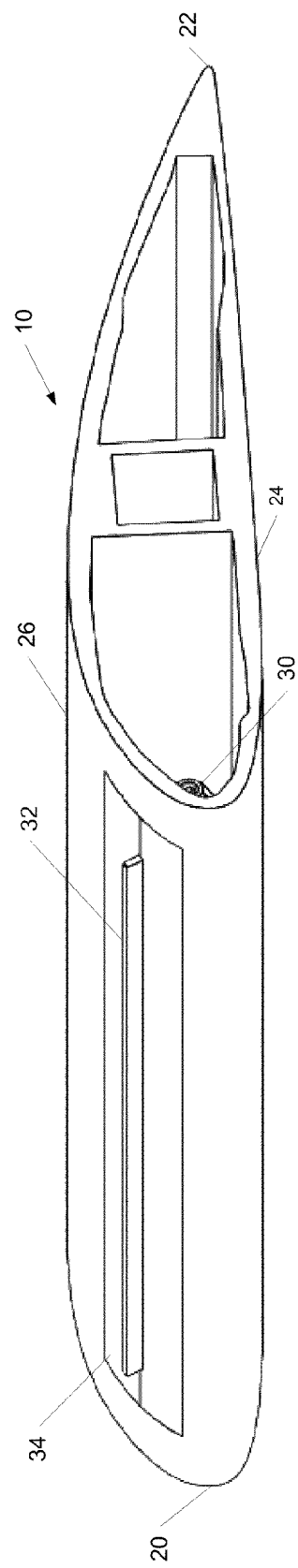

FIGS. 4 and 5 are isometric sectional views through the rotor blade 10 depicting the low pressure side wind gust counteracting device 30 with the air deflector 32 in a retracted position (FIG. 4) and in an extended position (FIG. 5). The wind gust counteracting device 30 is suitably mounted by an interface to substantially maintain the surface contour the rotor blade 10. This may be accomplished by the use of one or more contoured cover plates 34 that fixedly attach to both the gust counteracting device 30 and the blade structure. Alternatively, the leading face of the wind gust counteracting device 30 may be suitably contoured and fixed to the blade structure. In another arrangement, the leading face of the wind gust counteracting device 30 may be mounted to the underside of the blade. Suitable fastening arrangements such as hardware and adhesives may be used.

Figure 6:
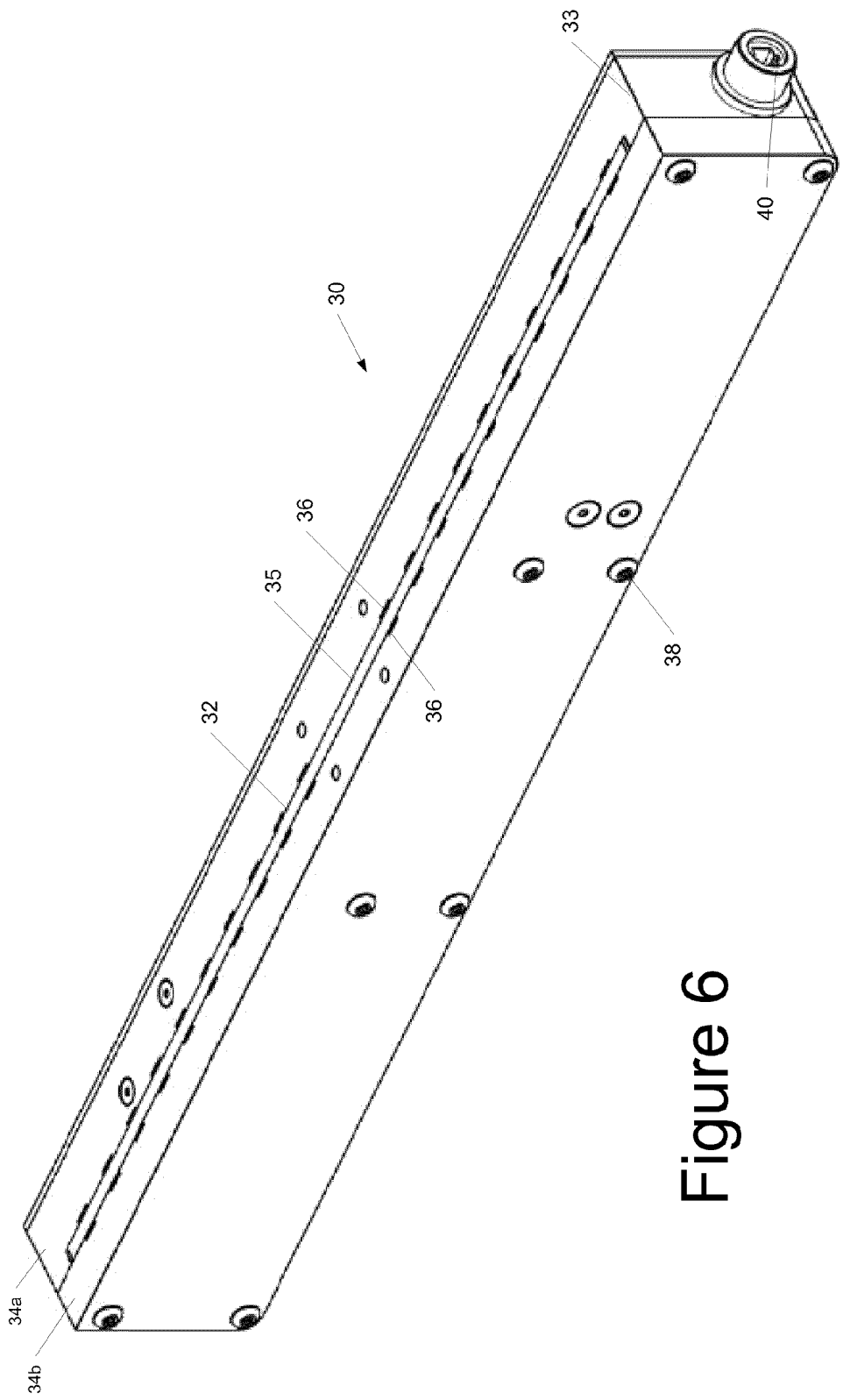
FIGS. 6 and 7 depict isometric views of an illustrative embodiment of a gust counteracting device, in isolation, with the air deflector shown in a retracted position (FIG. 6) and in an extended position (FIG. 7).
Figure 7:
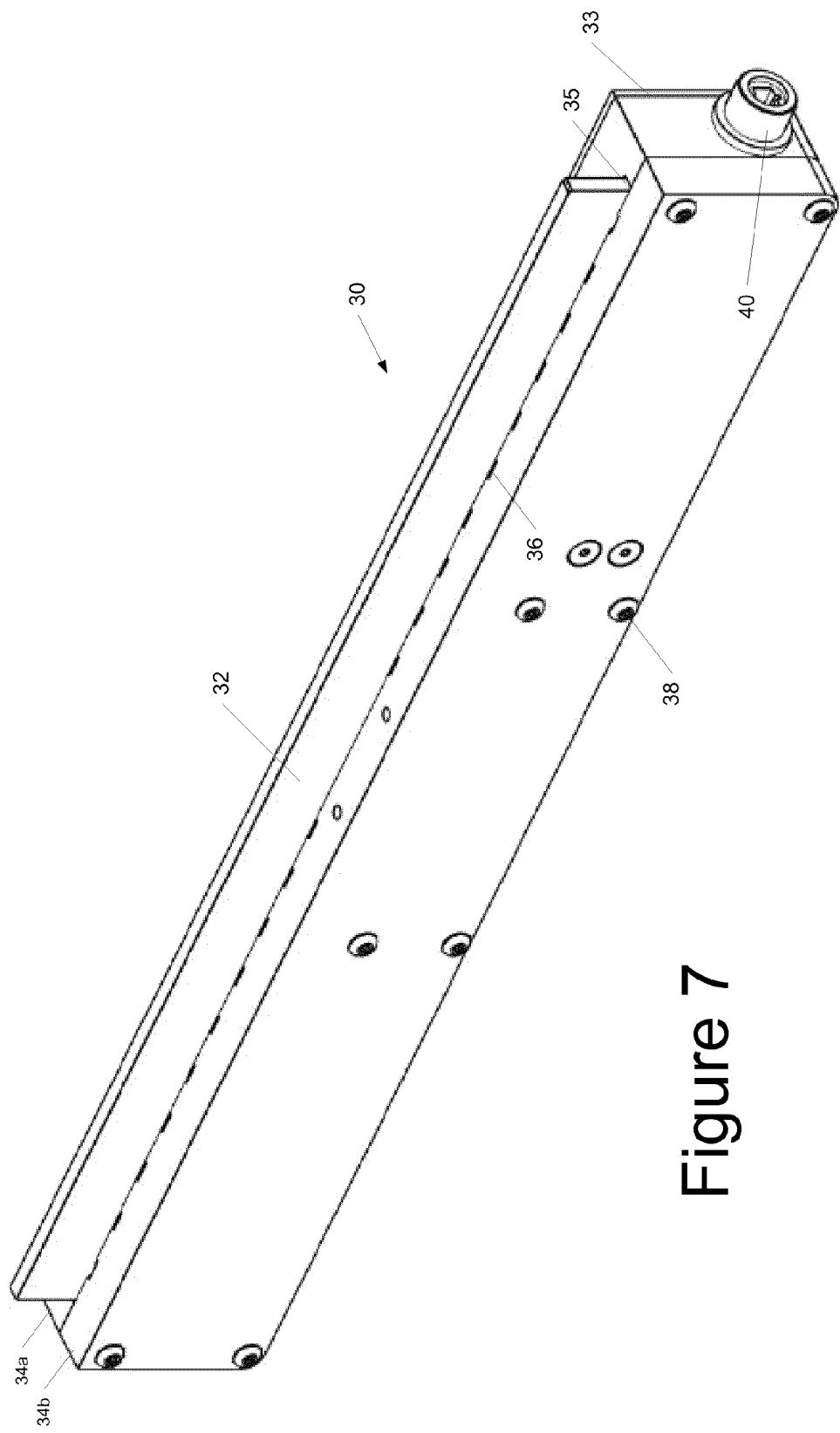

FIGS. 6 and 7 depict isometric views of an illustrative embodiment of a gust counteracting device 30, in isolation, with the air deflector 32 shown in a retracted position (FIG. 6) and in an extended position (FIG. 7). In a first arrangement, the gust counteracting device 30 includes frame 33 made from first and second portions 34a and 34b. The portions 34a and 34b interface so as to define a slot 35 in which the air deflector 32 travels. If desired, the facing edges of the first and second portions 34a and 34b include air exhausts 36. Air exhausts 36 are generally used in pneumatic configurations (i.e., where the air deflector 32 is actuated by pressurized air) to release retained pressurized air, thereby allowing the air deflector 32 to return to an alternate position (e.g., retracted or extended). The operation of air exhausts like air exhausts 36 is discussed in further detail below with respect to FIGS. 18a and 18b.

According to one aspect, gust counteracting device 30 may include guide notches (not shown) that act as a track for the air deflector 32. For example, the lower portion of the air deflector 32 may include projections (not shown) that are sized, spaced, and shaped complimentary to the guide notches. The projections may then follow the track corresponding to the notches when the air deflector 32 is extended or retracted. Such an arrangement provides increased alignment and additional structural support. Any desired arrangement, such as screws and other hardware 38, may be used to affix the first and second portions 34a and 34b of the gust counteracting device 30 together. If openings in the rotor blade 10 are accommodated to be the same size, the air deflector 30 and its separate modular characteristic, facilitate easy replacement from potential damage, such as if hit by lightning, or selected replacement for customization purposes. Additionally or alternatively, port 40 may be provided as a fluid conduit coupling, e.g., to connect to a pressurized air source via an air tube or the like.

Figure 8:
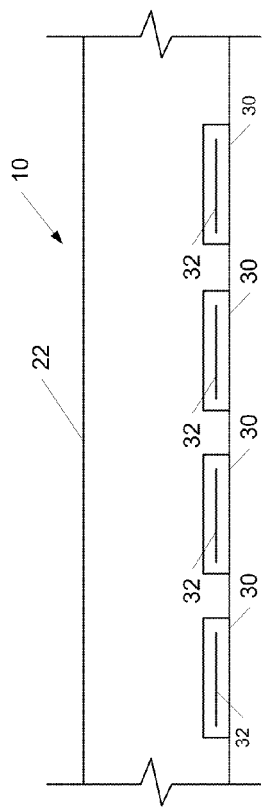
FIG. 8 is a schematic cross section of a rotor blade showing an illustrative spacing arrangement for a series of gust counteracting devices.
Figure 9:
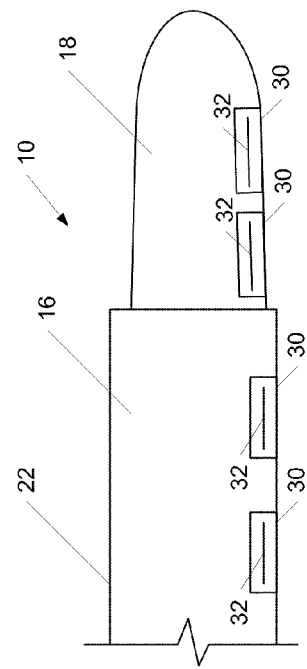
FIG. 9 is a schematic cross section of a longitudinally-telescopic rotor blade showing an illustrative spacing arrangement for a series of gust counteracting devices.

As described above, if more than one gust counteracting device 30 is used on each rotor blade 10, they may be longitudinally spaced along the length of the rotor blade 10 as desired. FIG. 8 depicts an illustrative spacing arrangement for a series of gust counteracting devices 30 with the air deflectors 32. FIG. 9 depicts a longitudinally-telescopic rotor blade 10 showing a series of longitudinally-spaced gust counteracting devices 30 with air deflectors 32 on both the base portion 16 of the rotor 10 and the tip portion 18 of the rotor 10. For each arrangement, and based on space constraints within the rotor blade 10, it may be desirable to longitudinally space the gust counteracting devices 30 at wider intervals so that they may alternate between locations on the high pressure side 24 (FIG. 2) and the low pressure side 26 (FIG. 2).

Figure 10:
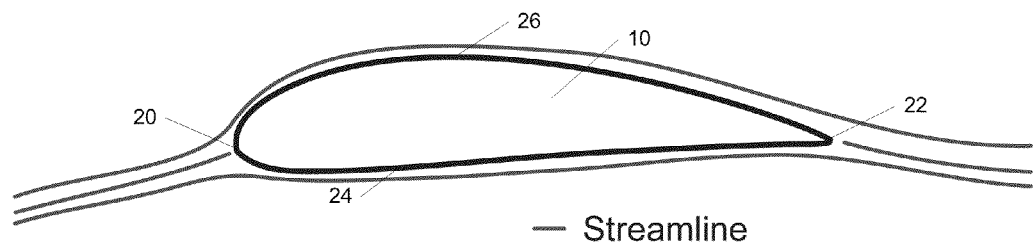
FIG. 10 is a schematic sectional view of a rotor blade representing airflow under normal wind conditions.

The functionality of the gust counteracting device 30a and 30b is generally described herein with respect to FIGS. 10-14. FIG. 10 shows a rotor blade 10 being subjected to airflow under normal wind conditions where the angle of attack of the wind, i.e., the angle between the chord line c and the direction of the relative wind, is within normal desired operating conditions. Such conditions are reflected in the graph of FIG. 14 where the angle of attack is between the lines represented by $\alpha_1$ and $\alpha_2$. In this range, the air deflectors would preferably remain in a retracted position as the wind conditions are achieving the desired lift with low drag. The boundary layer of the air flow on the low pressure side 26 is completely attached. Such may achieve desired operating results under normal wind conditions.

Figure 11:
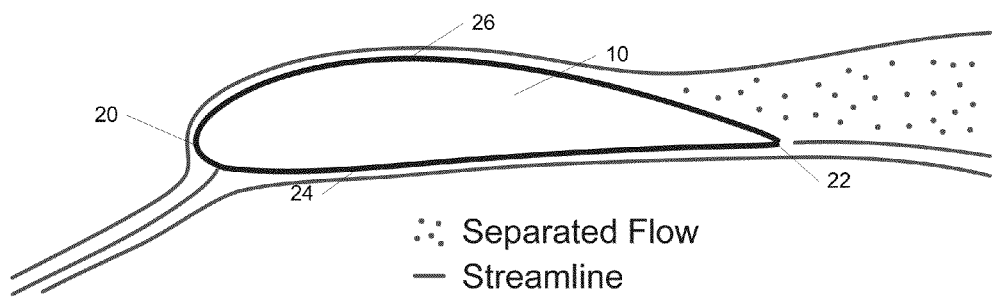
FIG. 11 is a schematic sectional view of a rotor blade representing airflow under a first gust condition.

FIG. 11 shows the rotor blade 10 being subjected to airflow under a gust condition that quickly increases the angle of attack of the wind in excess of $\alpha_1$. This creates increased lift and may exceed desired loads. As described above, this can damage components and force a shut down. The lift and drag characteristics on the rotor blade 10 under these conditions are shown on the graph in FIG. 14 by the line segments to the right of $\alpha_1$ containing point G1.

Figure 12:
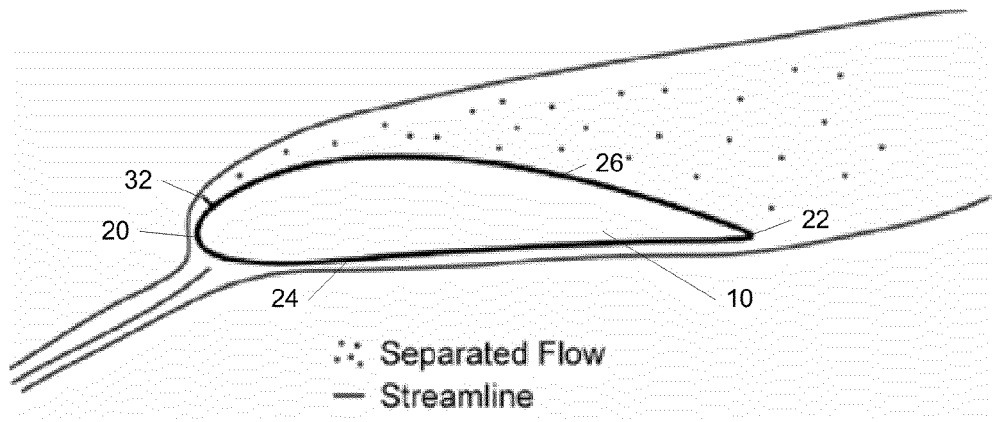
FIG. 12 is a schematic sectional view of a rotor blade representing airflow under a first gust condition schematically depicting a low pressure side air deflector in an extended position and the effect on air flow.

Operation of the gust counteracting device 30a on the low pressure side 26 under these conditions counteracts the negative effects of such a gust. Such effects are shown in FIG. 12. FIG. 12 depicts similar wind conditions relative to the rotor blade as shown in FIG. 11. In FIG. 12, the gust counteracting device 30a (e.g., the load control device) is deployed to move the air deflector 32 to the extended position. This induces upper flow separation adjacent or at a minimum closer to the leading edge 20. This creates a significant increase in drag and a large reduction in lift. Since the gust counteracting device 30a can move the air deflector 32 from the retracted position to the extended position in a fraction of a second, the load on the rotor blade and the other components can likewise be reduced in a fraction of a second to better preserve the equipment and prevent failures.

Figure 14:
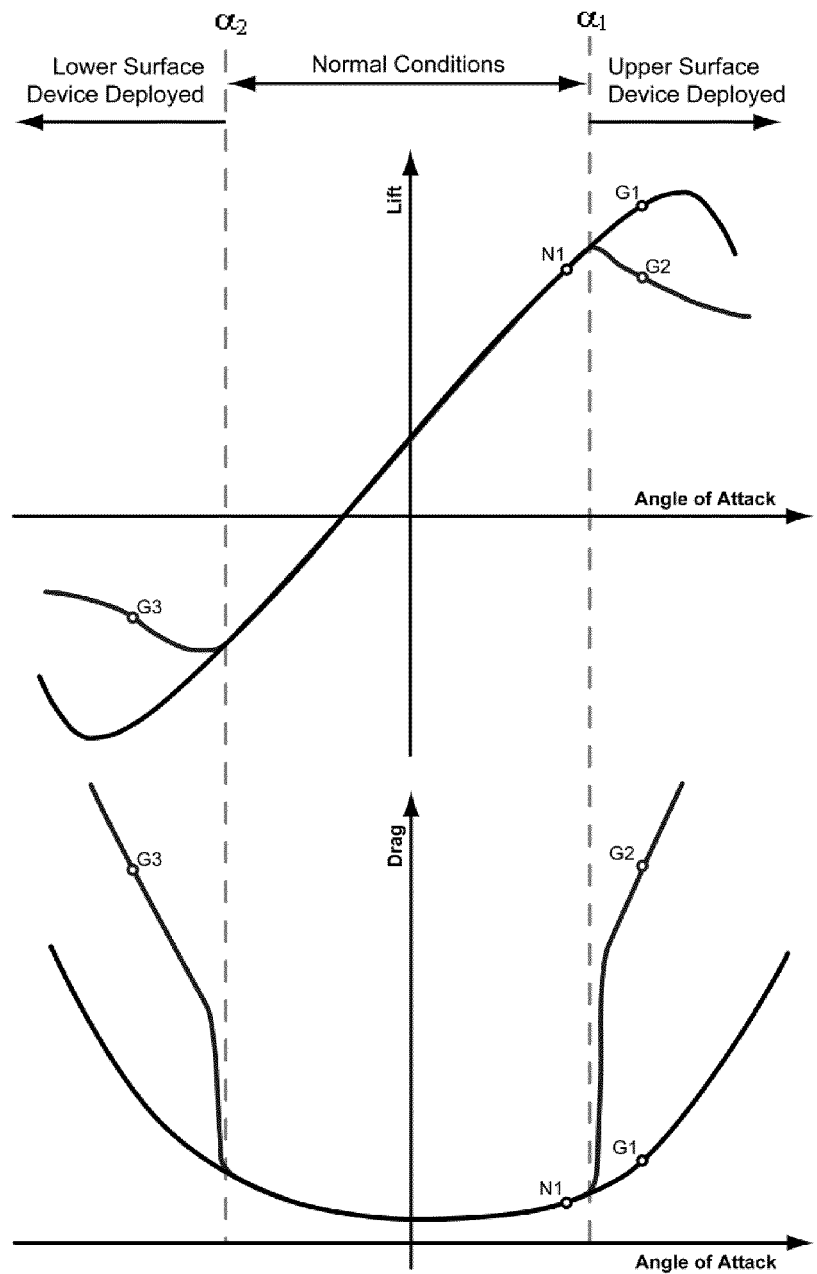
FIG. 14 is a graph depicting the lift and the drag on the rotor blades as a function of the angle of attack of the wind and the operational effects of the position of the air deflectors (deployed or retracted) on the high and low pressure sides of the rotor blades.

The lift and drag characteristics on the rotor blade 10 under these conditions are shown on the graph in FIG. 14 by the line segments to the right of $\alpha_1$ containing point G2. Specifically, the decrease in lift with the extended air deflector 32 is represented by the difference between the line segments to the right of $\alpha_1$ containing point G1 and G2, respectively. Additionally, the increase in drag with the extended air deflector 32 is represented by the difference between the line segments to the right of $\alpha_1$ containing point G2 and G1, respectively. When the angle of attack moves back into normal conditions, the air deflector 32 may be moved back into its retracted position.

Figure 13:
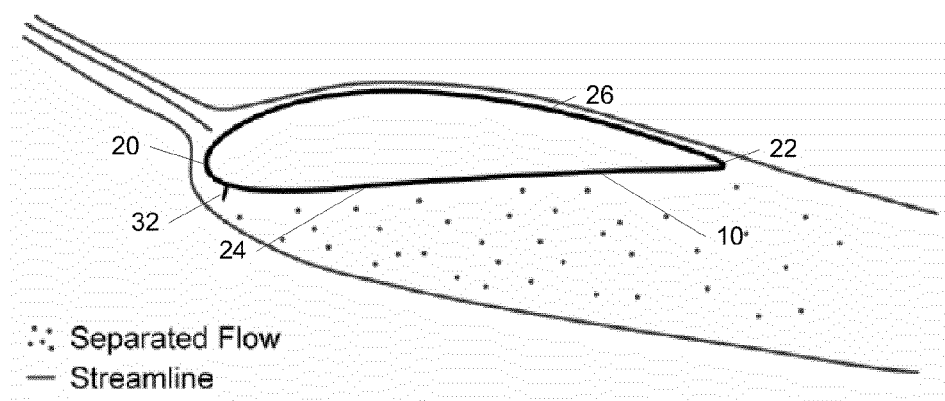
FIG. 13 is a schematic sectional view of a rotor blade representing airflow under an alternative gust condition schematically depicting a high pressure side air deflector in an extended position and the effect on air flow.

FIG. 13 is a schematic sectional view of a rotor blade representing airflow under an alternative gust or wind turbine rotor emergency stop conditions and schematically depicting a high pressure side air deflector 32 in an extended position and the effect on air flow. In the conditions as depicted in FIG. 13, the angle of attack has fallen below $\alpha_2$ (see FIG. 14). Without the deployment of the high pressure side air deflector 32, the lift would continue to decrease as depicted in FIG. 14.

However, when the air deflector 32 on the high pressure side is moved to an extended position, lower surface flow separation is immediately induced. This in turn, increases the drag, but has the effect of reducing the unwanted negative lift. The lift and drag characteristics on the rotor blade 10 under these conditions are shown on the graph in FIG. 14 by the line segments to the left of $\alpha_2$ containing point G3. This offset of the unwanted negative lift reduces the aerodynamic loads on the wind turbine during undesirable wind gust conditions or wind turbine rotor emergency stop conditions. When the angle of attack moves back into normal conditions, the air deflector 32 may be moved back into its retracted position.

The air deflector 32 is beneficial under other gust conditions, such as a sudden increase in wind speed without a change in the angle of attack. By quickly moving the air deflector 32 from the retracted position to the extended position, on either or both the low pressure side 26 (as shown in FIG. 2) or on the high pressure side 24, it alters the shape of the rotor blade 10 around or near the leading edge 20. This in turn drastically changes the lift and drag properties of the blade 10. Thus, a strong wind gust that increases wind velocity and imparts an increased load on the equipment, can be counteracted in a fraction of a second by the deployment of one or more air deflectors 32. Thus, it effectively acts as instantaneous increase of drag, akin to functioning as an air brake.

Any desired drive may be used to move the wind gust counteracting devices 30 can move their respective the air deflector 32 between its extended and retracted position. In an illustrative arrangement in which a fluid such as air is used to control the movement of the air deflectors 32, a centralized source of pressurized air is operatively coupled to a port of the wind gust counteracting devices 30 (e.g., port 40 of FIGS. 6 and 7) via a conduit (e.g., conduit 58 of FIG. 15). Within the wind gust counteracting devices 30, an air pressure actuated solenoid or piston/cylinder and a valve is used to drive the air deflector 32 between its extended and retracted positions. A valve for controlling the flow of pressurized air, e.g., valve 73 of FIGS. 18a and 18b, may be electronically controlled if desired. In one arrangement, the signal to operate the valve and move the air deflector 32 travels via an optical fiber. If desired, a spring may be used to bias the air deflector 32 into either position as a fail safe. While some small amount of electricity may be needed to operate this system, and the power may be from a local source such as a battery or remotely from a conductive wire, this arrangement has advantageous attributes in that it minimizes power consumption and minimizes the likelihood of a lightning strike. It is recognized that alternative drive systems may be used. For example, a spring may be used to bias air deflector 32 into an extended position. To subsequently retract the air deflector 32, a motor may be used. Other electromechanical mechanisms and systems may also be used.

Figure 18A:
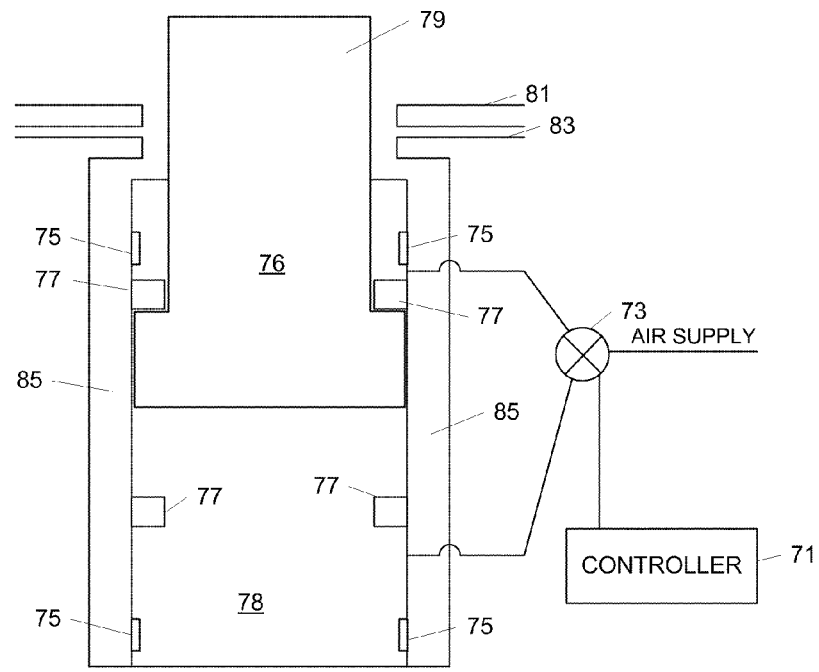
FIGS. 18a and 18b are schematic diagrams depicting a piston/cylinder arrangement for extending and retracting an air deflector according to one or more aspects described herein.
Figure 18B:
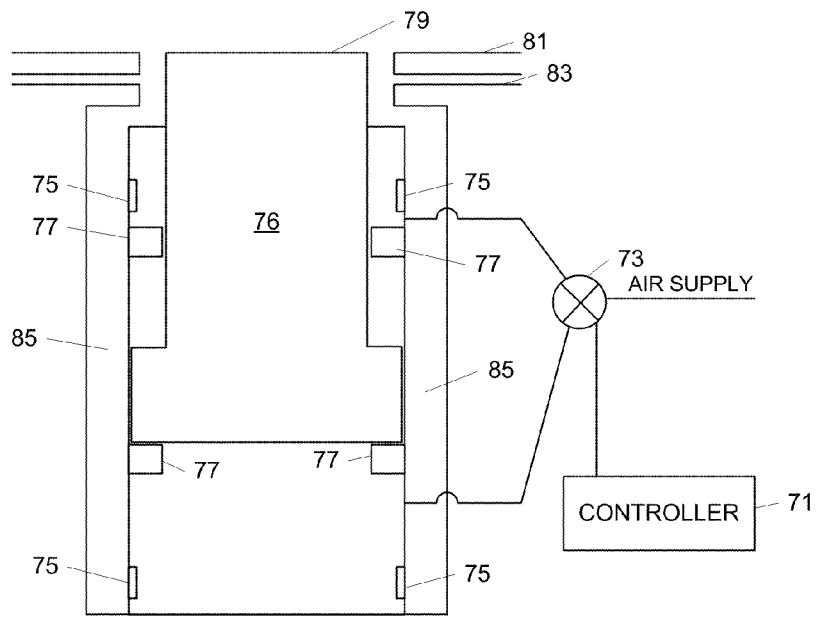

FIGS. 18a and 18b illustrate a piston/cylinder arrangement 76/78, a valve 73 and a controller for extending and retracting an air deflector 79. In the extended position shown in FIG. 18a, air deflector 79 (i.e., a top portion of piston 76) extends past a surface of the gust counteracting module in which the piston/cylinder arrangement 76/78 is housed and an exterior surface 81 of a corresponding airfoil rotor blade (not shown). Stoppers 77 are configured and placed to prevent air deflector 79 and piston 76 from extending past a certain point, thereby controlling an amount by which air deflector 79 may protrude from surface 81. In FIG. 18b, the air deflector 79 is in a retracted position and stoppers 77 prevent piston 76 and deflector 79 from retracting past a certain point. In the retracted position, the top of air deflector 79 may be flush with an exterior surface 81 of the airfoil rotor blade.

Controller 71 is configured to control valve 73 (e.g., a five way valve) to allow the flow of pressurized air into an upper chamber (i.e., a region above the base of the piston 76) or a lower chamber (i.e., a region below the base of the piston 76) of the cylinder 78. By injecting pressurized air into the upper chamber, for example, the piston 76 may be forced down into a retracted position (as shown in FIG. 18b). Injecting air into the lower chamber, on the other hand, forces the deflector 79 and piston 76 upward into an extended position (as shown in FIG. 18a). In one arrangement, pressurized air may be retained in either the lower or the upper chamber to hold deflector 79 and piston 76 in a corresponding position. Accordingly, pressurized air does not need to be continuously injected into a particular chamber to hold the deflector 79 in a particular position in such an arrangement. To subsequently move deflector 79 and piston 76 from an extended to a retracted position, or vice versa, the pressurized air currently retained in either the lower or upper chamber may be evacuated from cylinder 78 through one or more air release valves 75 (or other air release mechanism) and further released from the gust counteracting module through exhaust channel 85. According to one aspect, exhaust channel 85 may allow air to escape into the atmosphere. The air release valves 75 may be electronically controlled, e.g., by controller 71 and/or include mechanical control systems.

The wind gust counteracting devices such as devices 30 may be activated based on readings from one or more of various sensors and/or controller that used sense values to determine whether predetermined thresholds have been exceeded or when an air deflector should be moved based on an algorithm. Such sensors can include one or more of the following: accelerometers, strain gauges, absolute and differential pressure gauges, wind vanes, and wind speed detectors.

Figure 15:
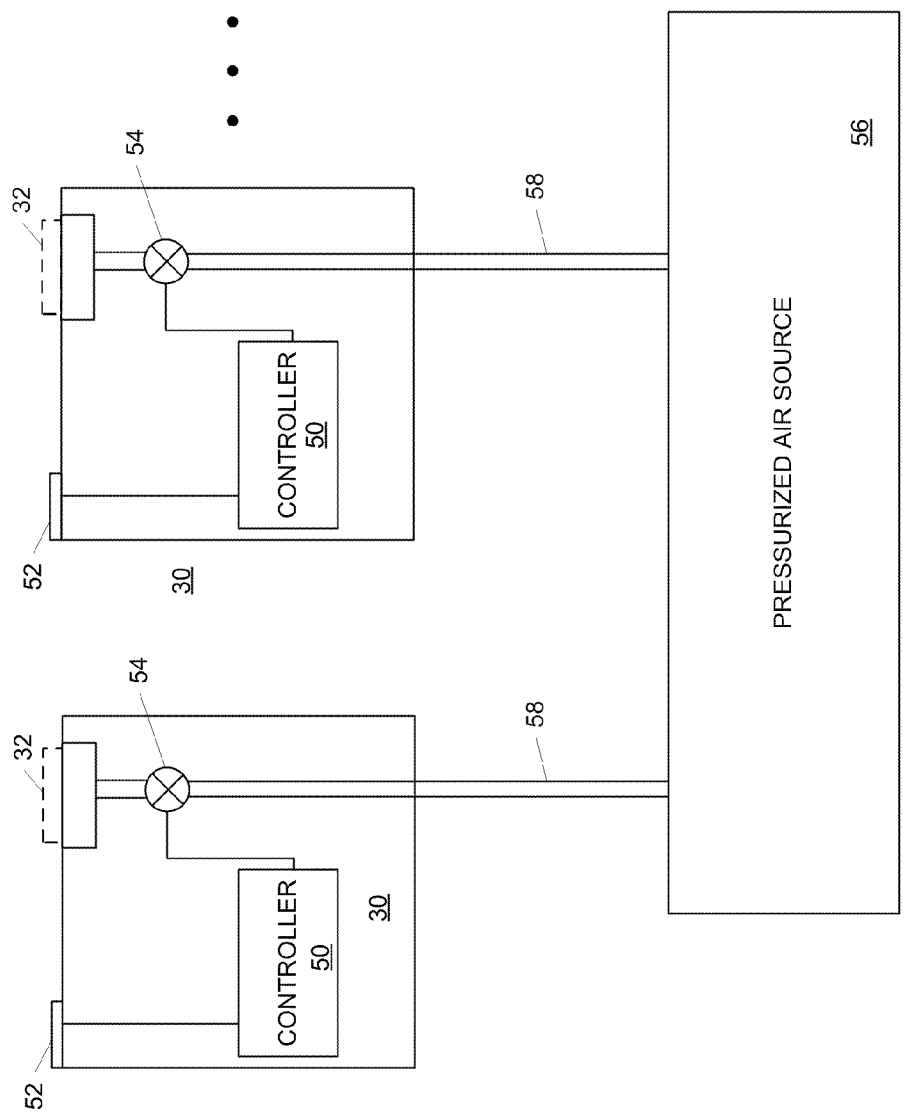
FIG. 15 is a schematic control diagram depicting a locally-controlled embodiment of the gust counteracting device.

As can be seen in FIG. 15, the gust counteracting devices 30 may each be locally-controlled. According to this arrangement, each of gust counteracting devices 30 would have a controller 50 and one or more sensors 52 coupled to the controller 50. Upon determining that a predetermined threshold has been exceeded (e.g., based on a reading from sensor 52), the controller 50 would send a signal to operate the valve 54 to control the flow of pressurized air and move the air deflector 32. According to this arrangement, each of gust counteracting devices 30 may be coupled to a common pressurized air source 56 via a fluid conduit 58.

Figure 16:
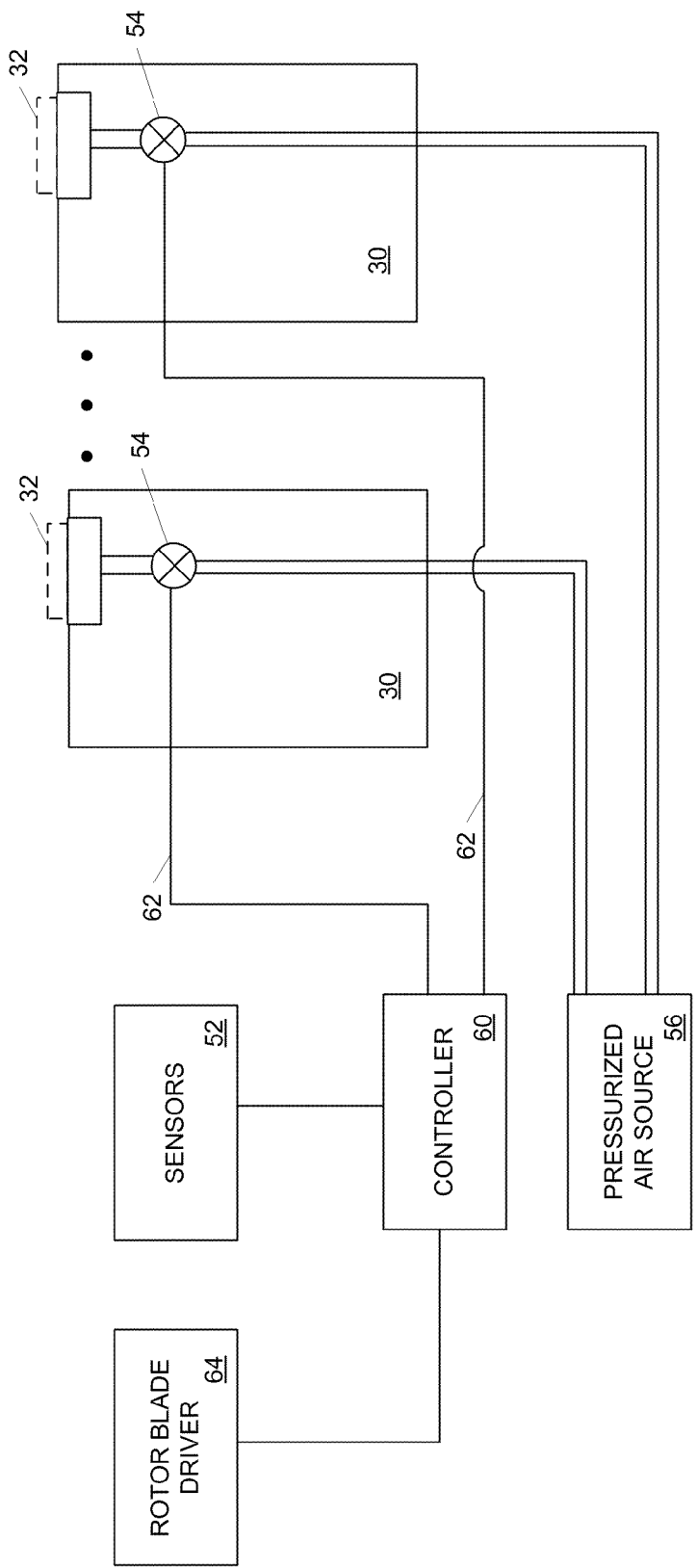
FIG. 16 is a schematic control diagram depicting a centrally-controlled embodiment of the gust counteracting device.

As can be seen in FIG. 16, the gust counteracting devices 30 may also be centrally-controlled. According to this arrangement, each gust counteracting device 30 would be functionally coupled to a common controller 60. Controller 60 could send signals to individually or commonly control the gust counteracting devices 30. Signals may be sent by controller 60 to each gust counteracting device 30 via an optical fiber 62 and/or other wired or wireless signaling mechanisms. Similar to the embodiment of FIG. 15, each of gust counteracting devices 30 may be coupled to a common pressurized air source 56 via a fluid conduit 58. In this centrally-controlled embodiment, there is more flexibility to use additional sensors 52 such as sensors spaced from the gust counteracting device 30. Additionally, the controller 60 may be coupled to the blade rotor drive system 64 to telescopically control the effective length of the rotor blades 10.

Figure 17:
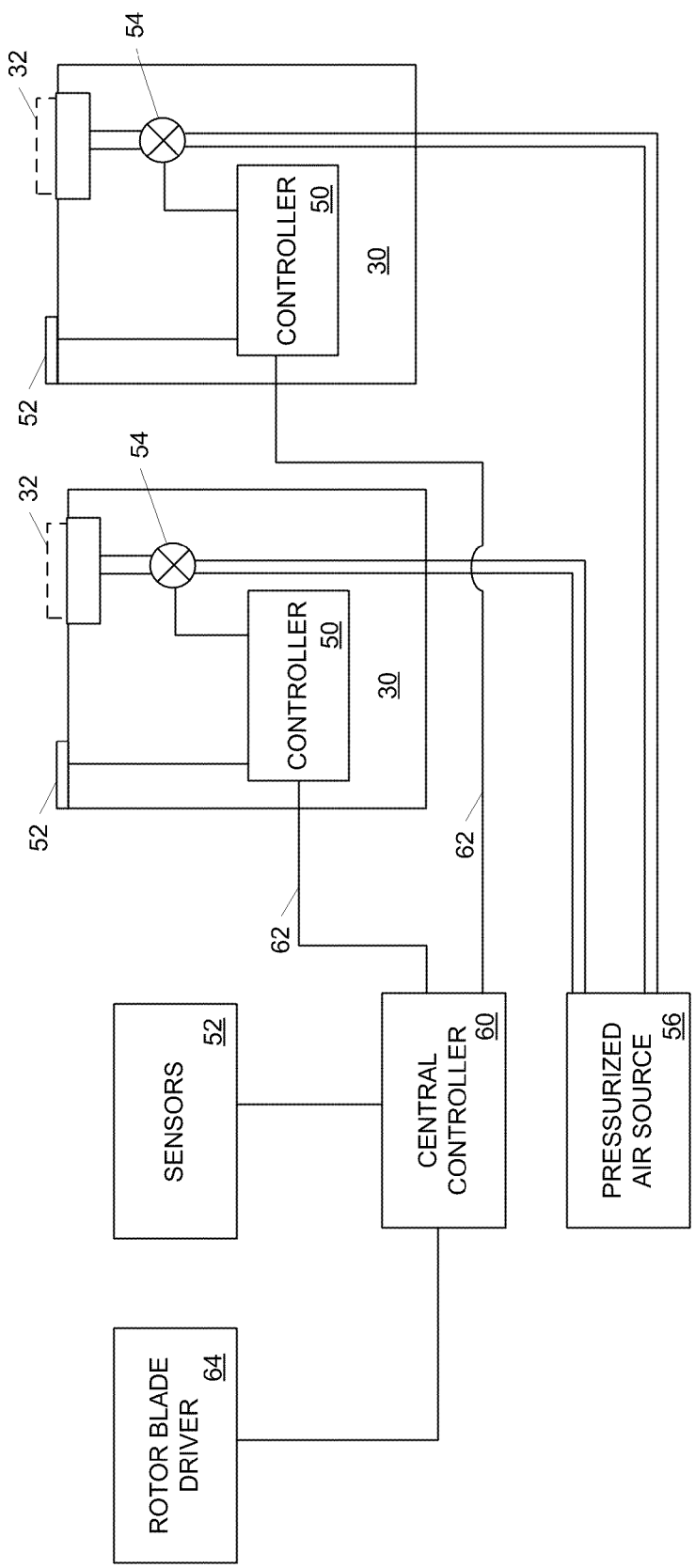
FIG. 17 is a schematic control diagram depicting a distributed control embodiment of the gust counteracting device.

Additionally, in another arrangement, the gust counteracting devices 30 are controlled according to a system containing substantially the details of FIGS. 15 and 16. As illustrated in FIG. 17, the gust counteracting devices 30 may each be controlled in a distributed manner. According to this arrangement, each of gust counteracting devices 30 would have a local controller 50 and one or more sensors 52 coupled to the local controller 50. Thus, each local controller 50 may independently control the extension and retraction of its corresponding deflector 32 based on detected conditions local to each controller 50. Additionally, the local controllers 50 are coupled to a central controller 60. Central controller 60 may send signals to the local controllers 50 to individually or commonly control the gust counteracting devices 30. Each local controller 50 may further send signals to the central controller 60 to inform the central controller 60 of a status of each of the gust counteracting devices 30. The collected status information may then be used by central controller 60 to determine an overall manner or scheme in which to control the local controllers 50 and deflectors 32 (e.g., to reduce load and/or optimize power capture). In this distributed control embodiment, there may also be flexibility to use additional sensors 52 such as sensors spaced from the gust counteracting device 30. Additionally, the controller 60 may be coupled to the blade rotor drive system 64 to telescopically control the effective length of the rotor blades 10. Such a distributed system may also provide redundancy. In each control arrangement, the controllers 50, 60 may be any desired or known control circuitry including but not limited to microprocessors.

According to one or more aspects, air deflector devices such as gust counteracting devices 30a and 30b (FIG. 1) may be used under conditions other than gusts. For example, air deflector devices may be used to compensate for normal turbulence, asymmetric loading, edgewise resonance and the like. The placement and deployment of air deflector devices may vary based on a desired effect or result. For example, in one or more configurations, a proper subset of air deflector devices installed on a rotor blade may be deployed to control lift production and drag under extreme airflow conditions. By modifying lift production and drag, air deflector devices may create desired effects on loads, power generation, aerodynamic braking, fatigue and the like. Each air deflector device may be individually and independently deployable such that various deployment configurations may be employed depending on the situation. Referring again to FIG. 15, for example, each air deflector device 30 may include its own controller 50 that controls a pressurized air valve 54 for deploying air deflectors 32. Alternatively, a central controller may be used that is configured to individually control an activation mechanism such as a pressured air valve for each air deflector device as illustrated in FIG. 16.

According to another aspect, air deflectors 32 may be deployed to varying heights. If, for example, higher drag is desired, an air deflector may be deployed to a greater height than if less drag is desired. Air deflector height may be incremental such that an air deflector may be deployed to a first height at a first point in time and subsequently to a second height at a second point in time without having to return to an undeployed position. In one configuration, an air deflector may be deployed to a height not exceeding an order of magnitude of the boundary-layer thickness of the local blade section. An order of magnitude may be defined as a multiple of the boundary-layer thickness between 1 and 10.

Figure 19:
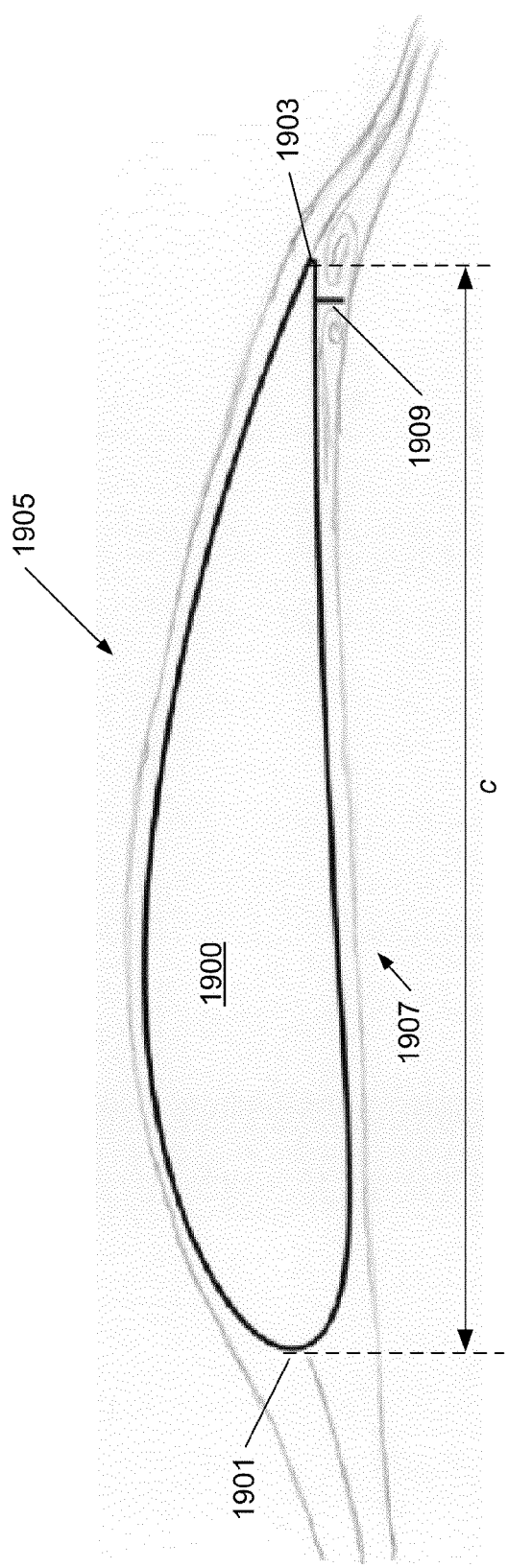
FIG. 19 illustrates air flow around a rotor blade having a trailing edge lower surface air deflector device deployed according to one or more aspects described herein.

FIG. 19 illustrates an air deflector deployment configuration and a resulting flow about a rotor blade. In particular, the placement and deployment of air deflector 1909 allows the system to increase lift production while minimizing drag penalty as compared to deployment of deflector 1909 at other locations. Rotor blade 1900 includes a leading edge 1901, a trailing edge 1903, a low pressure side 1905, a high pressure side 1907 and an air deflector 1909 located on high pressure side 1907. In one or more arrangements, air deflector 1909 may be located at trailing edge 1903 of high pressure side 1907, e.g., between 0.9 (90%) to 1.0 (100%) of the length of chord c. The placement and deployment of air deflector 1909 near the trailing edge 1903 of lower surface 1907 results in an effective increase in local airfoil camber, thereby increasing the lift. Increasing lift production, in turn, allows for greater power generation at a particular blade length. Additionally or alternatively, to minimize the potential drag penalty that accompanies the deployment of air deflector 1909, the height of air deflector 1909 may be on the order of the boundary layer thickness. That is, in some arrangements, the height of air deflector 1909 might not exceed the boundary layer thickness since drag increases with the height of air deflector 1909. Further, air deflector devices such as air deflector 1909 may be deployed in a direction perpendicular to the surface of rotor 1900. Alternatively, air deflector 1909 may deploy at an angle.

Figure 20:
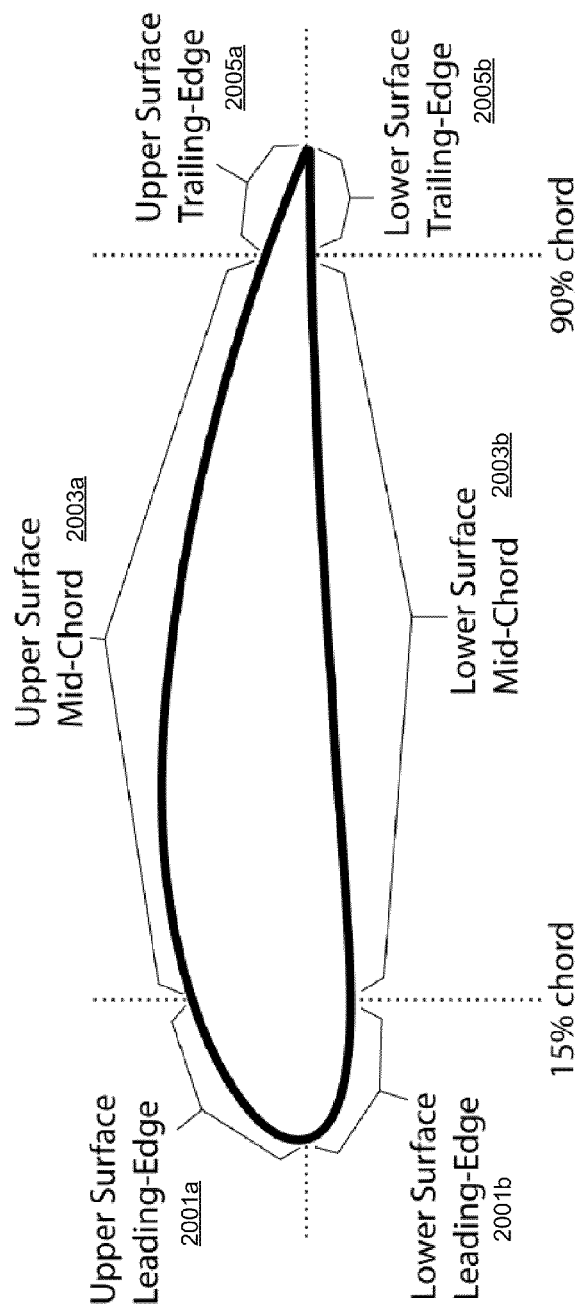
FIG. 20 illustrates an example configuration of regions on a rotor blade according to one or more aspects described herein.

FIG. 20 illustrates one example definition of a leading edge region 2001, mid-chord region 2003 and trailing edge region 2005. Leading edge region 2001 may be defined as the region of the high and low pressure side between 0% and 15% (0.15) of chord c while trailing edge 2003 may be defined as the region of the high or lower pressure side between 90% (0.90) and 100% (1.0) of chord c. Mid-chord region 2003 may be defined as the region between leading edge region 2001 and trailing edge region 2005 (i.e., between 15% (0.15) and 90% (0.90) of chord c). Alternative definitions may be employed. For example, leading edge region 2001 may be expanded to 0% to 25% (0.25) of chord c or reduced to 0% to 10% (0.10) of chord c. Similar modifications to the definitions of mid-chord region 2003 and trailing edge region 2005 may be made. In one or more configurations, gaps may exist between the various regions 2001, 2003 and 2005. That is, leading edge region 2001, mid-chord region 2003 and trailing edge region 2005 might not cover the entirety of the rotor blade surface or each region might not abut another region.

In one or more arrangements, the leading edge, mid-chord and trailing-edge regions 2001, 2003 and 2005, respectively, might further be divided into an upper surface region and a lower surface region. For example, leading edge region 2001 might include an upper surface (or low pressure surface) portion 2001a and a lower surface (or high pressure surface) portion 2001b. Mid-chord region 2003 and trailing edge region 2005 might similarly include upper and lower surface portions such as 2003a and 2003b and 2005a and 2005b, respectively.

Figure 21:
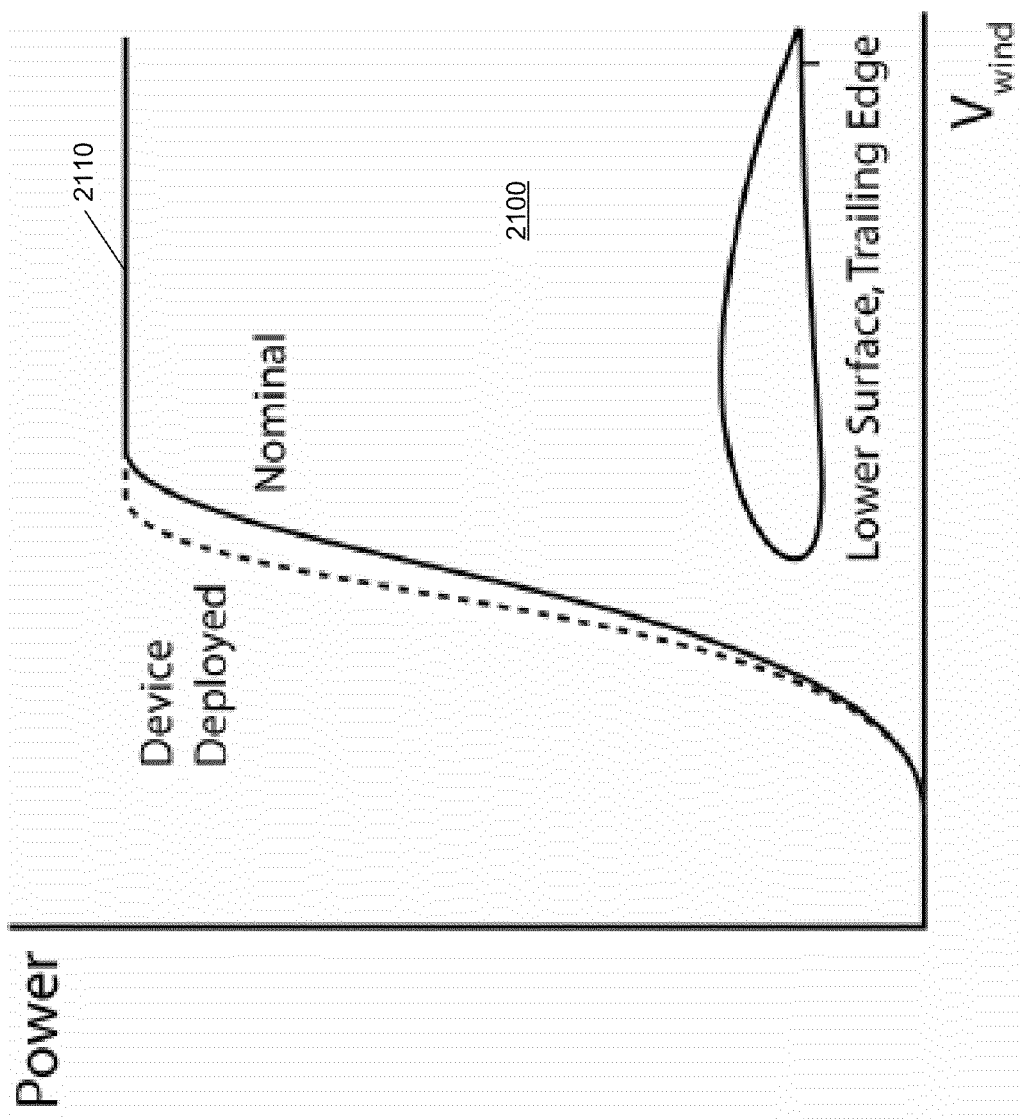
FIG. 21 is a chart illustrating the power generation affects of a rotor blade having a trailing edge lower surface air deflector device deployed.

FIG. 21 illustrates the increase in power generation of a turbine resulting from the deployment of an air deflector along the lower surface trailing edge of a rotor blade. As illustrated in the power vs. wind velocity chart 2100, deployment of a lower surface trailing edge device allows for greater power generation at lower wind speeds. For example, power generation reaches plateau 2110 at lower wind speeds in arrangements deploying an air deflector along the lower surface trailing edge than without the use of the air deflector device in the lower surface trailing edge of the rotor blades. Accordingly, power generation may be maximized in a wider range of wind speeds.

Figure 22:
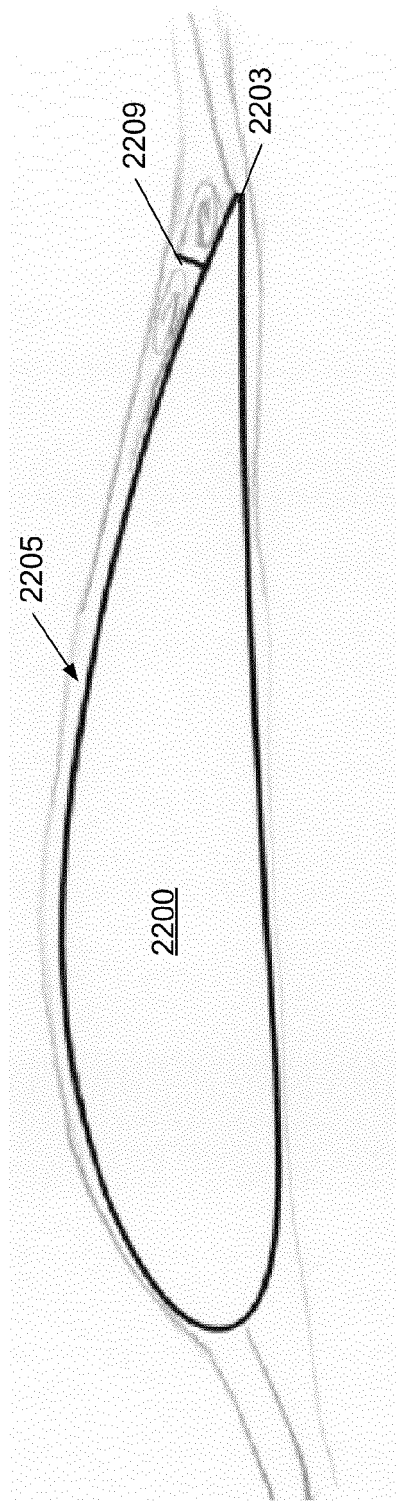
FIG. 22 illustrates air flow around a rotor blade having an upper surface trailing edge device deployed according to one or more aspects described herein.

FIG. 22 illustrates a flow about a rotor blade illustrating the placement and deployment of an air deflector device to decrease lift production while minimizing drag penalty. Decreasing lift production may help to decrease and control the amount of load experienced by a turbine (not shown). Placement and deployment of air deflector 2209 on a trailing edge 2203 of upper surface 2205 of rotor blade 2200 provides an effective decrease in local airfoil camber due to the upward deflected airflow (i.e., in contrast to the deployment of the air deflector 1900 of FIG. 19). As local airfoil camber decreases, so does lift. The extended height of air deflector 2209 may be used to control the change in lift, with increasing heights corresponding to larger decreases in lift. Thus, if a large decrease in lift is desired, air deflector 2209 may be deployed to a greater height than if a smaller decrease in lift is needed.

Figure 23:
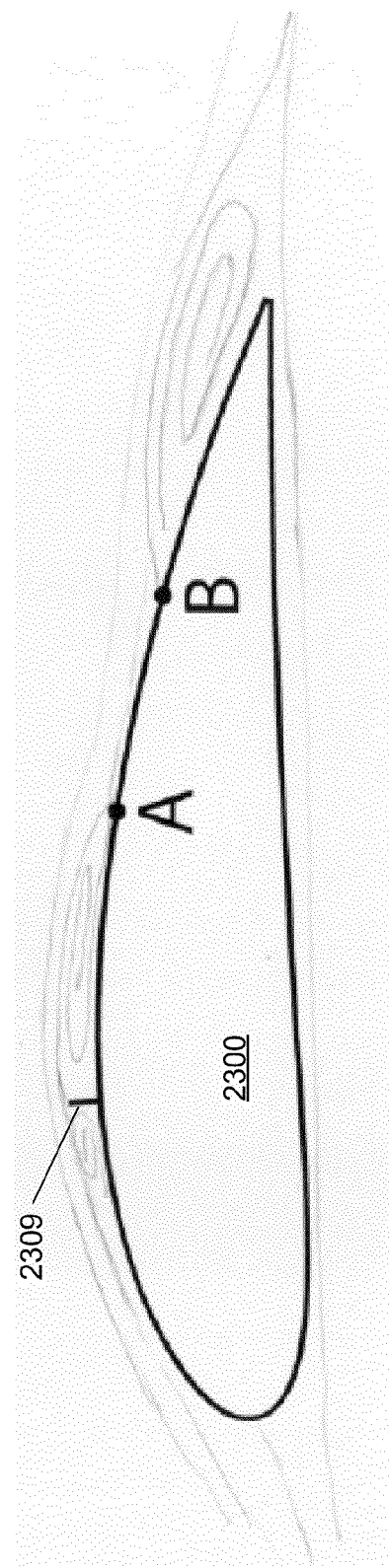
FIG. 23 illustrates a low angle of attack air flow around a rotor blade having an upper surface mid chord device deployed according to one or more aspects described herein.
Figure 24:
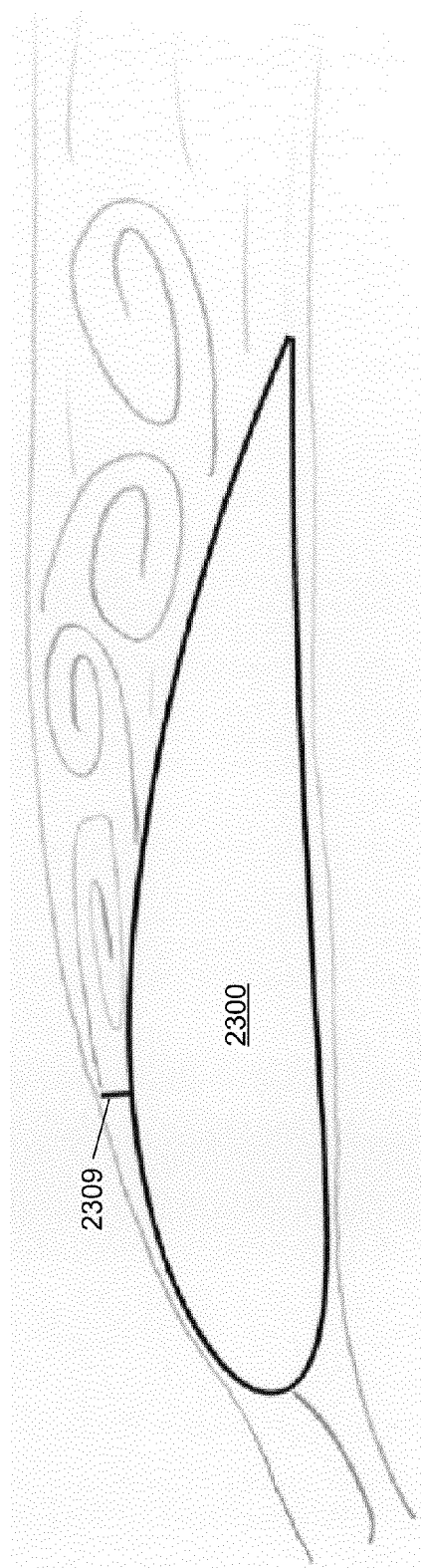
FIG. 24 illustrates a high angle of attack air flow around a rotor blade having an upper surface mid chord device deployed according to one or more aspects described herein.

FIGS. 23 and 24 illustrate flows about a rotor blade having a mid-chord air deflector deployed. In particular, the use of an upper-surface mid-chord device, such as device 2309, allows for a reduction in lift production and an increase in drag. In one or more arrangements, the reduction in lift production may be proportional to the increase in drag. For low angles of attack, as shown in FIG. 23, device 2309 induces local flow separation downstream. The flow may reattach, however, downstream, e.g., at point A. Momentum losses in airfoil boundary-layer may subsequently cause the flow to separate again, e.g., at point B, prior to the airfoil trailing edge. The flow separation caused by the device 2309 effectively increases the pressure on the upper surface and results in a lower net aerodynamic force (i.e., in combination with the pressure on the lower surface).

For high angles of attack as shown in FIG. 24, however, device 2309 may cause separated flow over the entire surface aft of the device. That is, the flow does not reattach to the surface of blade 2300 as is this case illustrated in FIG. 23 for low angles of attack. According to one embodiment, device 2309 may be positioned and deployed between 0.3 and 0.7 of the chord c on the upper surface of blade 2300.

Figure 25:
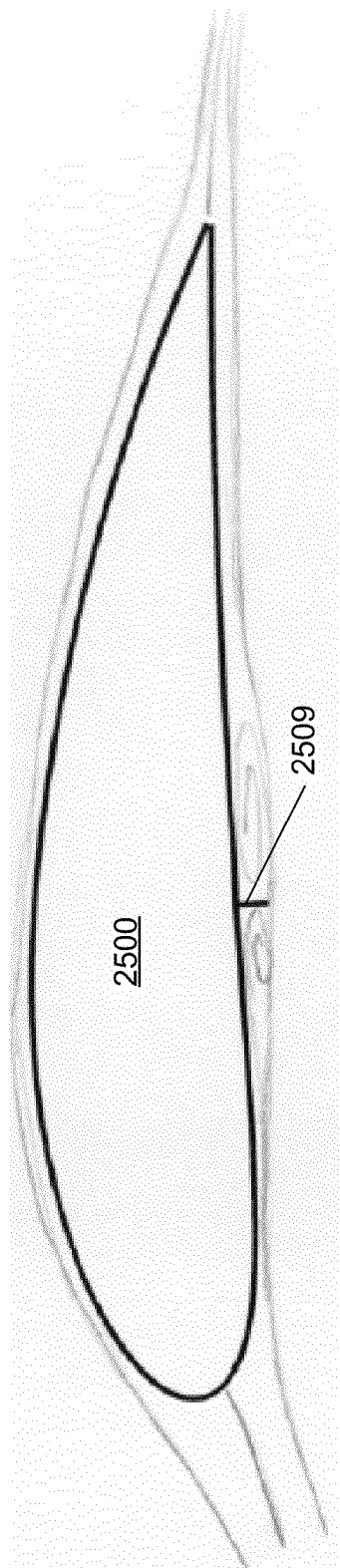
FIG. 25 illustrates air flow around a rotor blade having a lower surface mid chord device deployed according to one or more aspects described herein.

FIG. 25 illustrates air flow about a rotor blade having an air deflector positioned and deployed in a lower surface mid-chord region. Placement and deployment in this region provides an increase in drag production while minimizing change in lift. Air deflector 2509 causes local flow separation in the vicinity of device 2509, but due to a favorable pressure gradient, flow reattaches quickly. The quick reattachment of flow results in a smaller separation region and thus, a less significant impact on lift as compared to the effects of an upper surface mid-chord device such as device 2309 of FIGS. 23 and 24. Drag increases due to device drag (i.e., the presence of device 2509 in the high speed flow). In one or more embodiments, the device may be positioned between 0.2 and 0.8 of chord c on the lower surface of blade 2500.

Figure 26:
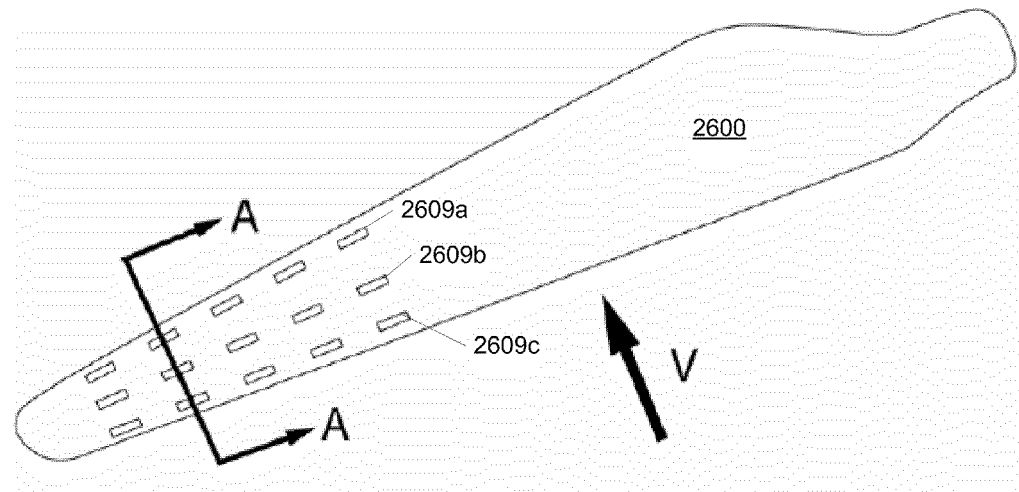
FIG. 26 illustrates an example air deflector device configuration on a rotor blade according to one or more aspects described herein.
Figure 27:
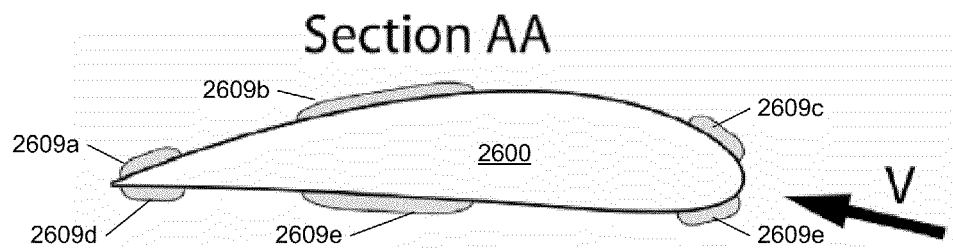
FIG. 27 is a cross-sectional view of the rotor blade of FIG. 25 taken at line A-A.

As illustrated in FIGS. 19 and 21-25, the effects of air deflectors may vary depending on the placement of the device on a rotor blade. According to one or more aspects, a rotor blade may include multiple air deflectors placed at varying locations on the rotor blade. FIGS. 26 and 27, for example, illustrate a rotor blade configuration where multiple air deflectors 2609 are placed along both the upper surface and lower surface of blade 2600. Devices 2609 may be placed at upper and lower surfaces on a trailing edge, leading edge and mid-chord region, resulting in a total of six sets of devices 2609, as shown in FIG. 27. Each set of devices 2609 may extend along a specified length of blade 2600. FIGS. 26 and 27 illustrate but one possible configuration of air deflectors 2609. Alternative configurations may be used based on the desired results.

As described herein, each of devices 2609 or sets thereof may be individually controlled and selectively activated. Stated differently, a trailing edge upper surface device such as device 2609a may be deployed irrespective and independently of a trailing edge lower surface device such as device 2609d or an upper surface mid chord device such as device 2609b. Similarly, multiple sets of devices 2609 may be deployed independently of a remainder of devices 2609. Providing independent control of each of devices 2609 or sets of devices 2609 allows a control system to deploy certain devices 2609 or combinations of devices 2609 based on current conditions and a desired result.

Figure 28:
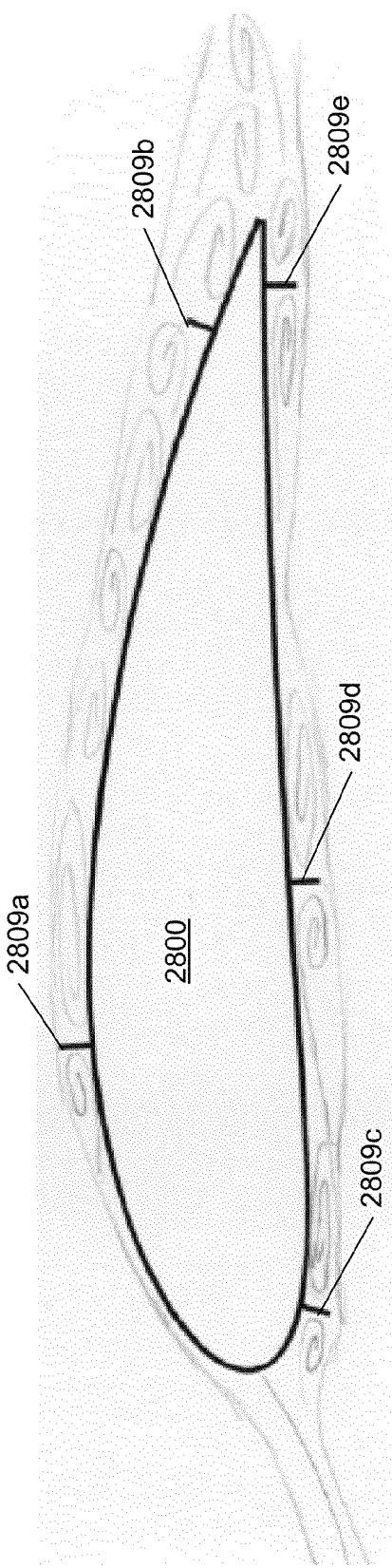
FIG. 28 illustrates an air flow around a rotor blade having a combination of air deflector devices deployed according to one or more aspects described herein.

FIG. 28 illustrates an example of a rotor blade where a combination of air deflectors is deployed. For example, rotor blade 2800 includes upper surface mid-chord and trailing device devices 2809a and 2809b, respectively, and lower surface leading edge, mid-chord and trailing edge devices 2809c, 2809d and 2809e, respectively. All of devices 2809 are deployed to provide aerodynamic braking. That is, by deploying all of devices 2809 in combination, flow disturbance is maximized, creating substantial separated flow on both the upper and lower surfaces. Accordingly, in highly turbulent or extreme air flow conditions, for example, such a deployment configuration may be used to reduce loads on rotor blade 2800 and an associated turbine (not shown). In some instances, the deployment of devices 2809 may be used to stop rotation of blade 2800 if, for example, extreme weather conditions and the resulting loads would cause a significant amount of damage to blade 2800 and the associated turbine.

Varying deployment controls modes may be defined and used to compensate for specific conditions or to produce a desired result. For example, different combinations of air deflectors may be deployed during normal turbulence, extreme conditions and conditions that worsen as blade length increases. Similarly, combinations of air deflectors may be deployed to provide pitch duty cycle reduction, asymmetric load reduction, emergency-stop load reduction and edgewise resonance damping. Pitch duty cycle reduction generally refers to minimizing the need to pitch the rotor blades to reduce loads.

Figure 29:
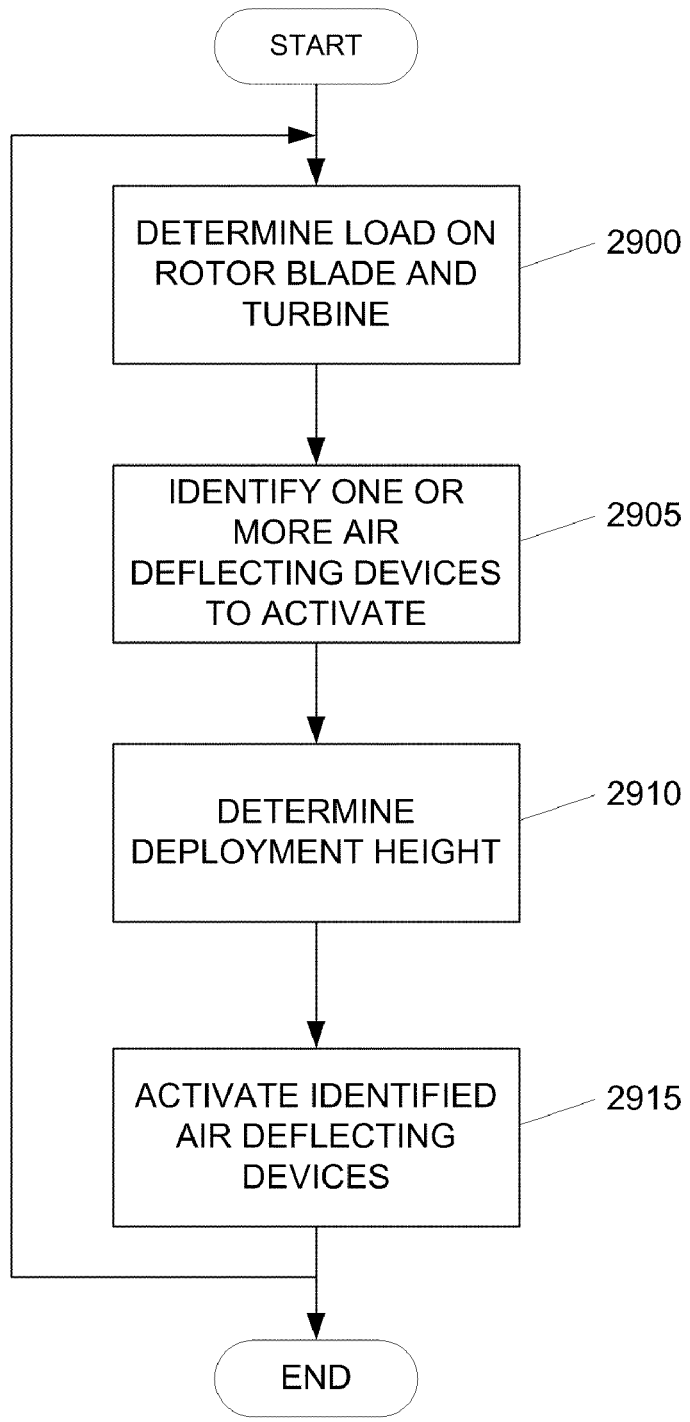
FIG. 29 is a flowchart illustrating a method for controlling the selective deployment of air deflector devices according to one or more aspects described herein.

FIG. 29 illustrates a control method for activating air deflector devices. In step 2900, a control system may determine current load conditions on a turbine. The load conditions may be measured using a variety of sensors including accelerometers, strain gauges, pressure sensors and the like. Loads may be measured at various points on a rotor blade, on the turbine body or a combination thereof. In step 2905, the control system may determine or identify a set of one or more air deflectors to activate based on the determined load conditions. For example, rules may be defined such that if load conditions require the reduction of asymmetric loads on the blades, the control system may activate trailing edge air deflector devices. In step 2910, the control system may further determine a deployment height for one or more air deflector devices being activated. For example, the control system may want to limit the deployment height if drag is to be minimized or kept under a specified threshold. Other considerations such as power generation may also be used to determine a deployment height. Once a set of air deflectors has been identified for activation and the deployment height determined, the control system may subsequently activate the identified deflectors in step 2915 independently of other air deflectors on the rotor blade. The air deflectors may further be deployed according to the determined height. In one or more instances, the identified set of air deflectors may include less than all of the available air deflectors on the rotor blade.

Figure 30:
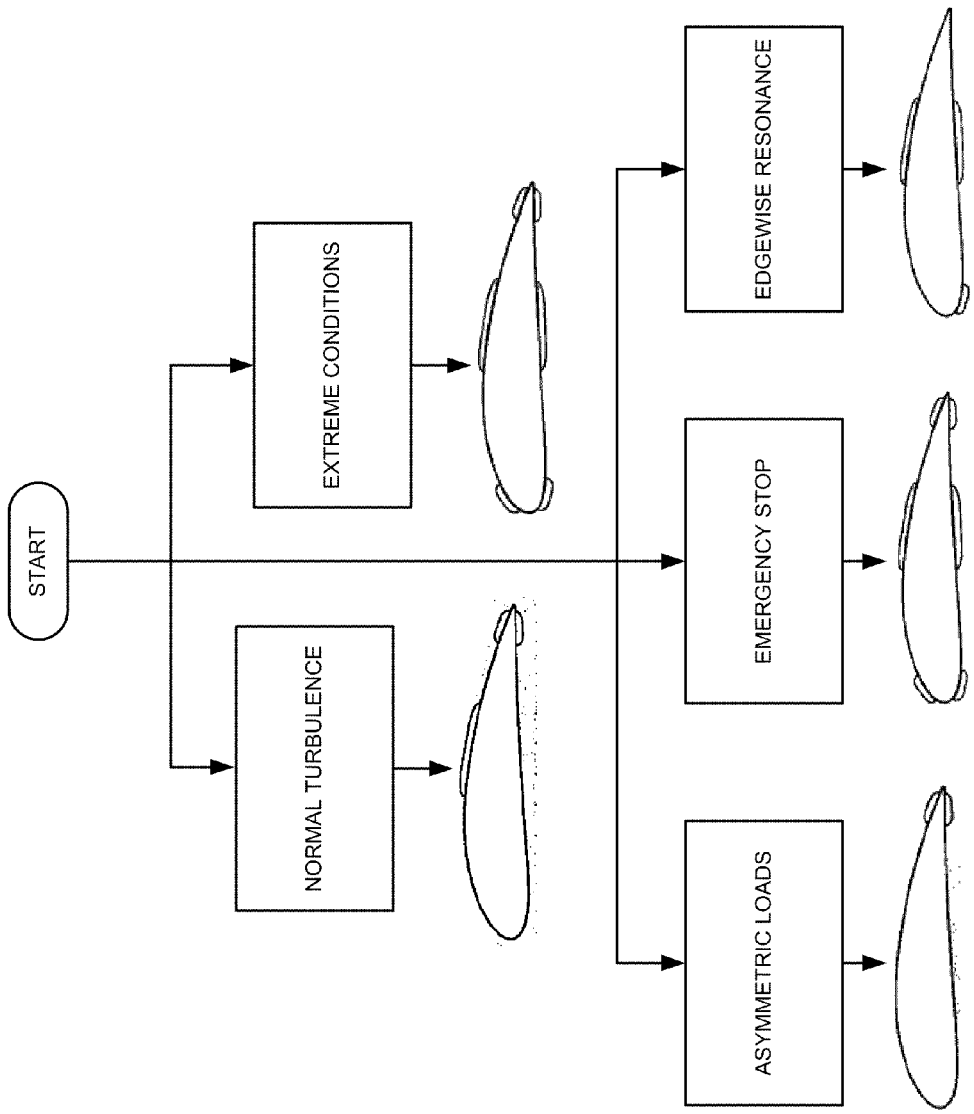
FIG. 30 illustrates various deployment configurations in association with different scenarios according to one or more aspects described herein.

FIG. 30 illustrates various control requirements along with possible deployment configurations that may be used to meet those control requirements. The illustrated configurations represent the regions in which air deflectors may be deployed to meet the corresponding control requirements. Deployment of air deflectors in all indicated regions is not necessarily required. In one example, during normal turbulence or loading, one or more of trailing edge devices on both the upper and lower surfaces and upper surface mid-chord devices may be deployed to reduce the magnitude of load fluctuations. In another example, to compensate for edgewise resonance, one or more of a lower surface leading edge device and upper and lower surface mid-chord devices may be deployed to dampen the vibrational load. Various other combinations and configurations may also be used. The configurations illustrated represent areas in which an air deflector may be deployed and is not indicative or representative of any particular shape or structure of air deflectors.

Normal turbulence, in some arrangements, may be characterized by a slowly changing average load with superimposed low amplitude, high frequency load variation. The loads caused by normal fluctuations may be measured using strain gages placed at the root or at local spanwise blade stations. Alternatively blade loading can be determined aerodynamically using pressure sensors or estimated using measured angle of attack. Because of the nature of normal turbulence (slowly changing average with high frequency variation in wind speed), an example device configuration may include upper surface mid-chord and/or trailing-edge devices, and/or lower surface trailing-edge devices at various spanwise stations, as shown in FIG. 30. Each of an upper surface mid-chord device, upper surface trailing-edge device and lower surface trailing-edge device may be individually and independently deployed. The placement and number of devices used may be dependent on the amount of load change that is desired/required and the blade section airfoil shape.

Figure 31:
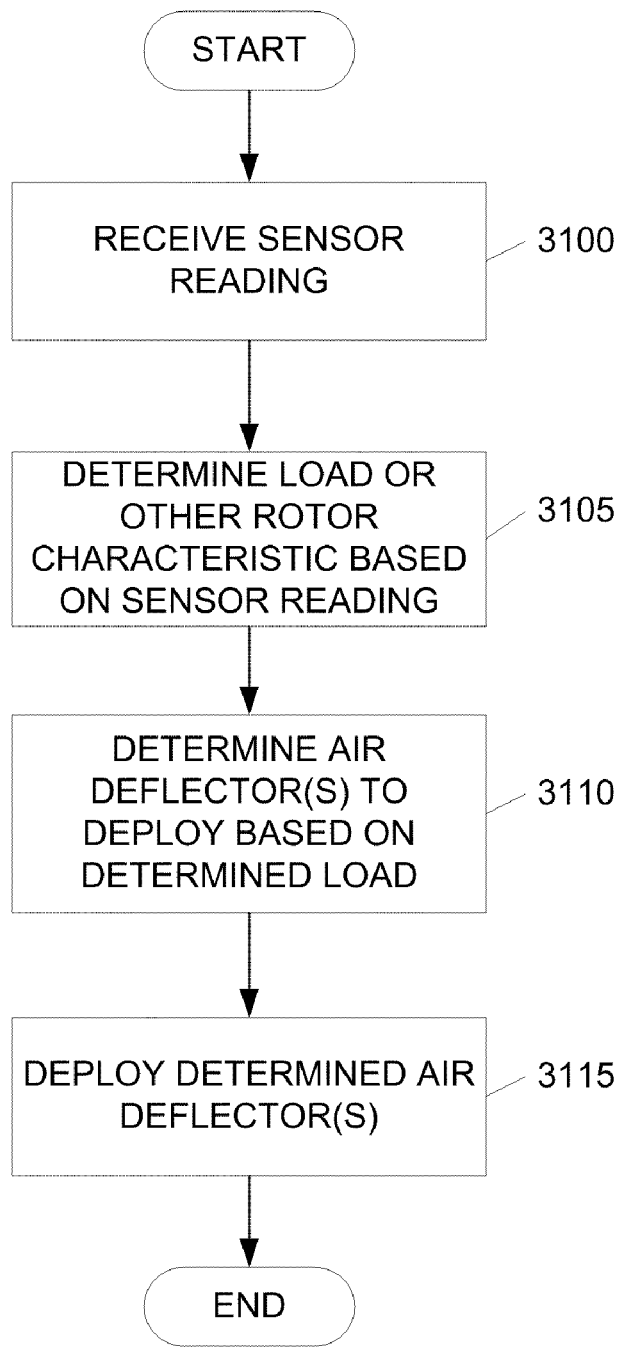
FIG. 31 illustrates an example method for selectively activating one or more air deflector devices according to one or more aspects described herein.

FIG. 31 illustrates a control strategy that may be used for each independent device or a collection of devices. In step 3100, the controller may receive sensor readings. Based on these sensor readings, the controller may subsequently determine the instantaneous load conditions in step 3105 based on absolute load values, deviations from some operational average, or the rate change of absolute values. Alternatively or additionally, the controller may determine rotor torque, rotor speed or other rotor or turbine characteristic to control deployment of air deflectors. In step 3110, the controller may then determine one or more air deflector devices to deploy based on the determined load conditions. For example, the controller may determine if device deployment or retraction is warranted for each device, collection of devices, or subset of the device collection based a threshold load, rotor torque, speed and the like. In step 3115, the determined air deflector device(s) may be deployed.

Generally, deployment of a device is dependent on the desired aerodynamic effect. If the load (lift, drag, and/or moment) drops, subsequently causing a reduction in power output, a lower surface trailing-edge device, or a set of devices, may be deployed to increase the lift, hence, increasing the power output. If the load increases beyond an acceptable value (e.g. power gets too high, or excessive fatigue loads), load reduction is required. In this case, an upper surface trailing-edge device is required. The trailing-edge device might not always be effective, however, due to aerodynamic limitations. Briefly, at high angles of attack the trailing-edge device will be washed out by stall, i.e. rendered ineffective. For instance, modern pitch-to-stall turbines typically run at higher angles of attack (i.e. near stall) near rated power. In this situation (near stall), if a gust or some other turbulent activity were to occur, a trailing-edge device might not work because the device is inside separated flow. This is where a mid-chord device may be used, since the stall pattern typically starts at the trailing-edge and works its way forward. So, for instance, if the sensor devices indicate to the controller that the blade is at a high angle of attack, control logic could be used to decide on which device to deploy: a trailing-edge device for maximum lift reduction with minimal drag or a mid-chord device for lift reduction with higher drag. Another controller methodology uses load measurement from blade strain or pressure sensors. With this information, the default deployment for load reduction may be an upper-surface trailing-edge device. With the device deployed, if the loads or rate change in loads, etc., have not returned to acceptable levels the upper-surface mid-chord device would be deployed.

Asymmetric loads, on the other hand, may be the result of cyclic effects caused by yaw error, wind shear, tower shadow, etc., which cause variation in blade loading depending on blade azimuth. With asymmetric loads, an equilibrating force is needed to equilibrate the loading among the various blades to reduce fatigue, pitch motor duty cycle, etc. As with normal turbulence, the loads may be measured using strain gages placed at the root or at local spanwise blade stations. Alternatively, blade loading can be determined aerodynamically using pressure sensors or estimated using measured angle of attack. Other sensor types, arrangements and placements may also be used.

To mitigate asymmetric loads, trailing-edge devices placed on the upper and/or lower surfaces may be used. Several spanwise locations may be necessary depending on the amount of load change to counteract. As described above, trailing-edge devices are useful to increase (lower surface placement) and decrease (upper surface placement) lift with minimum drag penalty (compared to similar devices placed further forward). Keeping drag to a minimum is important because of its implications to power output and turbine efficiency.

The controller could use instantaneous load data to determine which device to deploy based on tolerance conditions (absolute load, rate change in load, etc., as described above). Alternatively, because asymmetric loads tend to have a cyclic component due to blade rotation, a schedule could be developed to deploy or retract a device based on blade azimuth. This control scheme, however, might not be capable of handling turbulent or other fluctuations in wind conditions. Other control methods may include feedback control to determine which device to deploy for individual devices, or a collection of devices.

Edgewise resonance refers generally to an increase in edgewise load (blade loads in the rotational plane) due to disturbances matching the resonant frequency of the blade. Edgewise resonance can be particularly problematic since turbine blades have very little edgewise damping. Lack of damping in a physical system can lead to dramatic failures under resonance conditions (e.g. Tacoma Narrows Bridge). To prevent or quash resonance, it is necessary to increase the edgewise damping of the blade.

Figure 32:
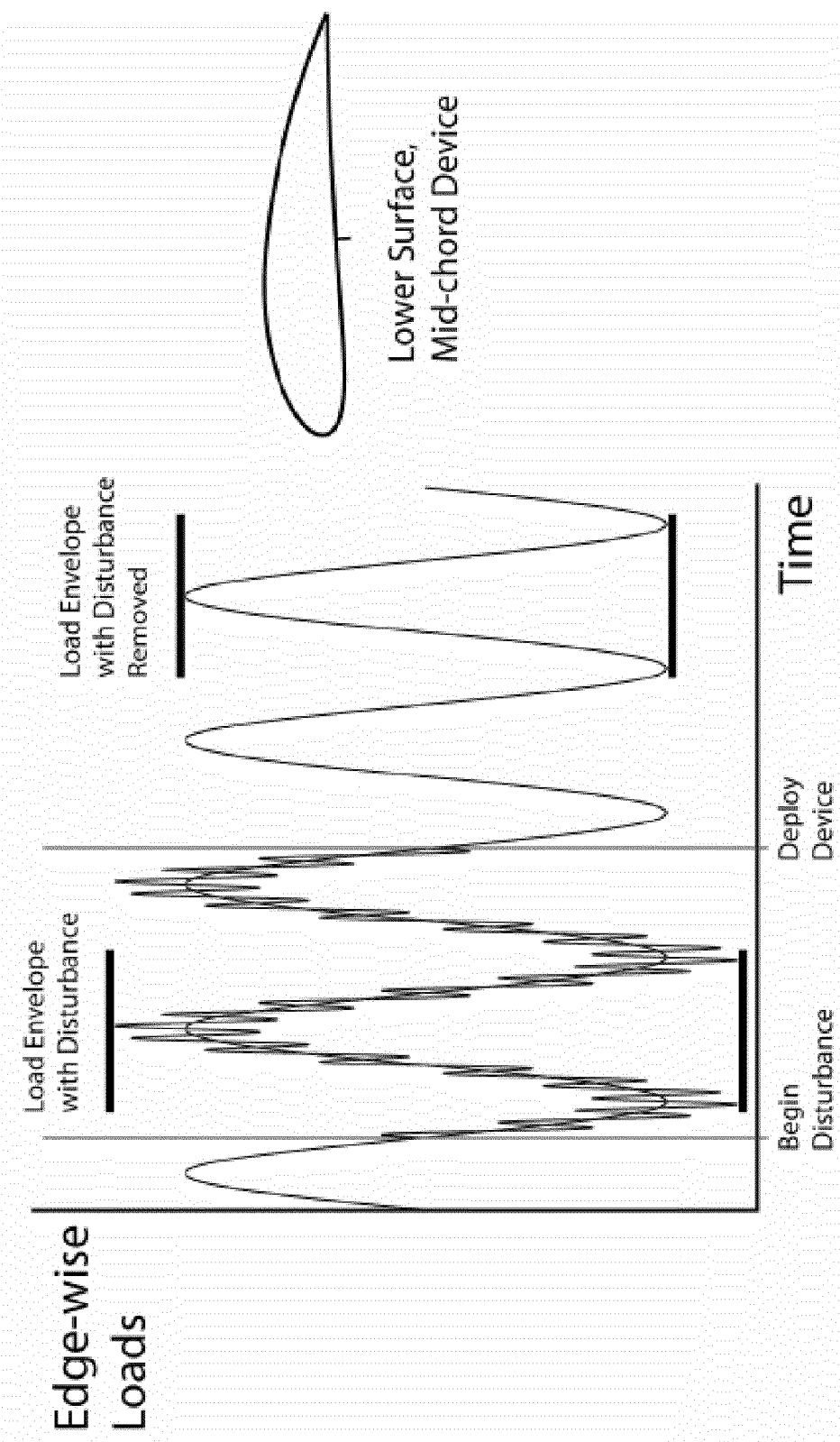
FIG. 32 illustrates edgewise loading of a rotor blade before and after deployment of an air deflector device according to one or more aspects described herein.

Edgewise resonance may be measured using accelerometers or strain gages. These sensors may be placed at the blade root or at some other spanwise location. In both cases (accelerometers or strain gages), resonance may be distinguished by noting "blooming"—an increase in load coupled with superimposed frequency—about the normal, cyclic edgewise load signature caused by the blade mass and rotation. FIG. 32 illustrates such edge-wise loads before and after a lower surface mid-chord device has been deployed.

Reducing resonance can be accomplished aerodynamically using air deflector devices (e.g., devices 2609) to increase the drag, hence increasing edgewise damping of the blade. Devices that may be used for this application may be located on the upper and lower surface at a mid-chord region and on the lower surface at the leading edge region (as shown in FIG. 30). Devices in each of these regions may be independently controlled on an individual basis or based on region or some other specified grouping.

Deployment of mid-chord devices generally causes dramatic increases (compared to other locations) in drag, accompanied by changes in lift. Upper surface mid-chord devices tend to produce large drag increments with large changes in lift; the magnitude of these effects is dependent on chord location and height of the device. Lower surface mid-chord devices tend to cause similarly large drag increments, typically with smaller impact to the lift. Depending on the airfoil and device placement, it may be possible to simultaneously deploy an upper-surface mid-chord device and a lower-surface mid-chord device in such a way as to minimize the effects on lift. Another deployment schedule may include spanwise alternation between upper and lower surface mid-chord device deployment.

Figure 33:
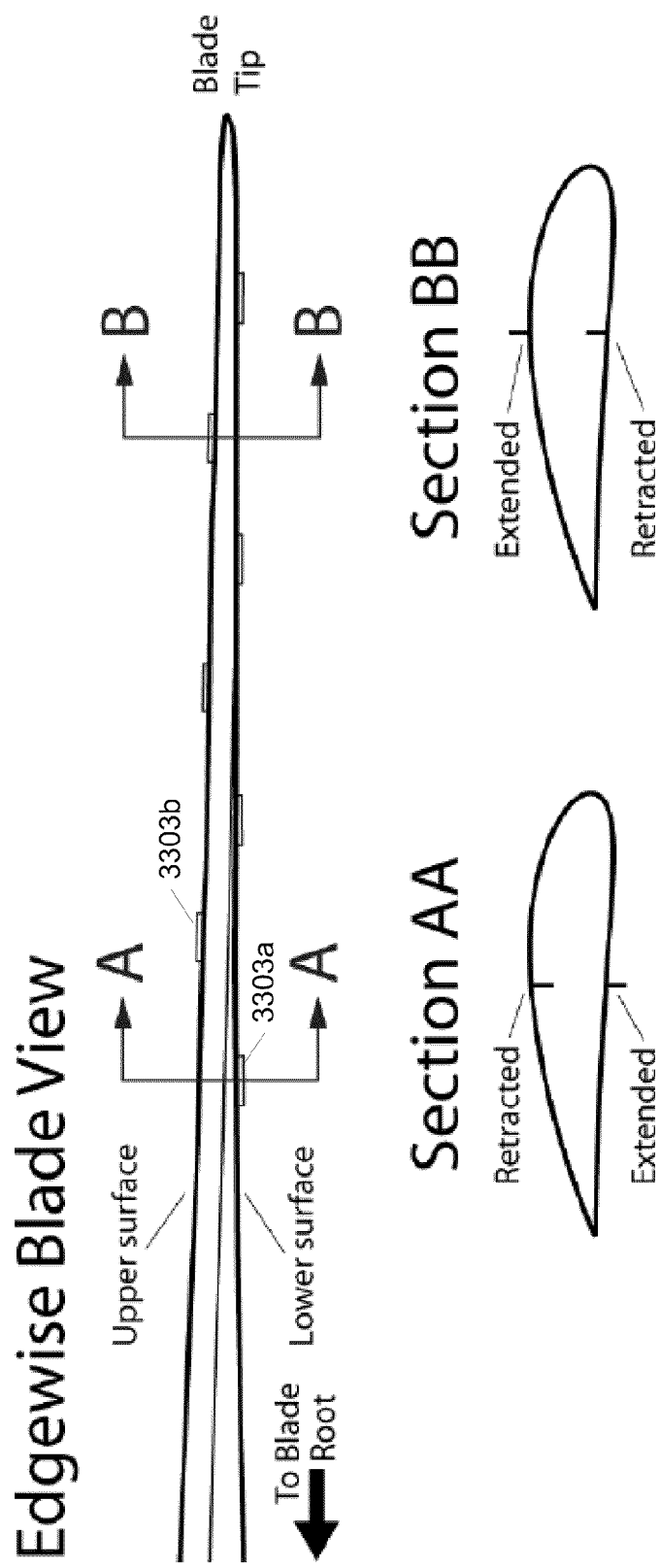
FIG. 33 illustrates an example rotor blade having an alternative spanwise air deflector device deployment configuration according to one or more aspects described herein.

FIG. 33 illustrates an example rotor blade having an alternating spanwise configuration of upper and lower surface air deflector devices. As illustrated, at a first spanwise station a lower-surface device 3303*a* may be deployed. At a next spanwise station, an upper-surface device 3303*b* is deployed. This pattern may be repeated for all spanwise stations. Sections AA and BB illustrate the position of upper surface and lower surface air deflector devices at the indicated spanwise stations.

For reducing edgewise resonance, changing lift might not be desired. Accordingly, a lower surface leading-edge device may be used. The lower surface leading-edge device generally does not influence positive lift (lift at positive angles of attack) but does cause an increase in drag. While the drag increment is not as large as mid-chord devices, hence giving lower edgewise damping, the lack of lift change may be beneficial.

An emergency shutdown is generally defined as a "rapid shutdown of the wind turbine triggered by a protection function or by manual intervention" (International Electrotechnical Commission (IEC) 61400-1, ed. 2005, p. 10). This condition is typically indicated by the turbine run state of the turbine controller. In one emergency stop condition example, the turbine controller (separate or integrated with the air deflector device controller) may issue a special command that some fault has occurred. In this situation, all available aerodynamic and mechanical braking is used to arrest the rotation of the wind turbine rotor. The pitch system is used to rapidly change the blade pitch to reduce aerodynamic loads. The mechanical brake is applied once the rotor speed is reduced via blade pitch. This pitch-then-brake approach can cause dramatic and potentially damaging transient loads to the entire turbine system (blades, tower, gear box, etc.). Using devices as shown in FIG. 30, the transient loads can be reduced by quickly eliminating the aerodynamic loads, faster than current pitch systems can function.

In emergency stop conditions, it may be beneficial to have devices on the upper and lower surfaces at leading-edge, trailing-edge, and mid-chord locations at various spanwise stations along the blade. A controller can be developed to read the emergency stop code from the turbine controller. The device controller could then deploy all of these devices (as shown in FIG. 28), simultaneously or in a determined sequence, which would cause the flow to separate over the entire blade section (in the vicinity of the devices) reducing the aerodynamic load very quickly.

Another category of conditions that may be provided for under a control scheme allowing the independent deployment of air deflector devices is extreme conditions. Extreme wind conditions, for example, generally refer to "wind shear events, as well as peak wind speeds due to storms and rapid changes in wind speed and direction" (IEC 61400-1, ed. 2005, p 25). Other extreme conditions may include icing and loss of electrical power grid. Extreme conditions may result in high loads occurring faster than existing wind turbine systems can respond.

In some extreme conditions, the wind may be rapidly changing direction and magnitude causing blade load fluctuations. The current approach to mitigate these fluctuations would be to activate the pitch system to change the aerodynamic loads. However, the pitch system might not be able to cope with the conditions due to the control rates of the system and the relative sluggishness of the aerodynamic response to pitch change. The described devices, on the other hand, are able to rapidly deploy due to their size and quickly affect blade aerodynamics due to the direct effects to the momentum of the flow in the boundary layer.

Extreme wind conditions may be determined using blade root bending moment, local blade angle of attack, and local blade loading from pressure sensor data. In order to handle extreme conditions, devices may need to be installed in all of the previously described locations (upper/lower surface, leading edge (LE)/midchord (MC)/trailing edge (TE) locations) because certain locations are more effective under various circumstances, as described above. Using sensors, such as those described herein, a control system may be configured to detect a transient wind event and choose the required devices to deploy based on local or global absolute load values, deviation of load values, or the rate change of the load values. The controller may then determine which device(s) to deploy based on the instantaneous load information from the sensors.

An extreme condition that includes the loss of the electric power grid may cause the turbine to experience rapid changes in loads. In addition to the load determination sensors described herein, the turbine controller run state (or fault state) could be used by a device controller to determine if an electrical fault has occurred. In this case, all devices (upper/lower surface, LE/MC/TE locations, multiple spanwise stations) may be deployed to provide aerodynamic braking and help prevent a runaway turbine condition. Alternatively, combined sensor and run state information could be used to deploy devices in a manner that would provide aerodynamic braking while also mitigating excessive loading.

Turbine blade icing is another extreme condition concern due to the increased loading due to the added weight of the ice and the change in aerodynamic loading due to the alteration of the blade shape. Devices could be placed at the upper and lower surfaces near the leading edge to detach ice as it forms on the blade by the extension and retraction of the devices. In this case, temperature and relative humidity could be used to determine if icing is probable and devices could be deployed at regular intervals for very short durations to break free any forming ice.

It should be understood that any of the method steps, procedures or functions described herein may be implemented using one or more processors in combination with executable instructions that cause the processors and other components to perform the method steps, procedures or functions. As used herein, the terms "processor" and "computer" whether used alone or in combination with executable instructions stored in a memory or other computer-readable storage medium should be understood to encompass any of various types of well-known computing structures including but not limited to one or more microprocessors, special-purpose computer chips, digital signal processors (DSPs), field-programmable gate arrays (FPGAS), controllers, application-specific integrated circuits (ASICS), combinations of hardware/firmware/software, or other special or general-purpose processing circuitry.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:
1. A method comprising:
 determining, by a control unit having at least one processor, a load on a rotor blade of a power generating turbine, wherein the rotor blade includes a plurality of air deflectors, wherein each of the plurality of air deflectors is configured to protrude from a surface of the rotor blade when deployed, and wherein a top surface of each of the plurality of air deflectors, when in a de-activated state, forms a portion of the surface of the rotor blade;
 identifying a set of one or more air deflectors to activate based on the determined load; and
 selectively, by the control unit, activating the set of one or more air deflectors, wherein the set of one or more air deflectors is a proper subset of the plurality of air deflectors, and
 wherein activating the set of one or more air deflectors includes raising an entire top surface of the set of one or more air deflectors above a surface of a remainder of the rotor blade.

2. The method of claim 1, wherein determining, by the control unit, by the control unit, the load on the rotor blade includes determining whether to increase power generation of the turbine; and in response to determining to increase the power generation, selectively activating an air deflector located at a trailing edge of a lower surface of the rotor blade.

3. The method of claim 2, wherein determining whether to increase power generation of the power generating turbine includes determining whether a current amount of power being generated is below a specified power generation threshold.

4. The method of claim 2, wherein the air deflector is located between 51% and 100% of the distance between a leading edge of the at least one rotor blade and a trailing edge of the at least one rotor blade.

5. The method of claim 2, wherein deploying the air deflector includes deploying the air deflector to a height on an order of magnitude of the boundary-layer thickness of the local blade section.

6. The method of claim 2, further comprising determining a height of the air deflector that results in a specified level of load change, wherein deploying the air deflector includes deploying the air deflector to the determined height.

7. The method of claim 1, wherein determining, by the control unit, the load on the rotor blade includes detecting a threshold amount of edgewise resonance and wherein the method further includes:

in response to detecting the threshold amount of edgewise resonance, selectively activating one or more of: a lower surface trailing edge air deflector, an upper surface mid-chord air deflector and a lower surface mid-chord air deflector.

8. The method of claim 1, wherein determining, by the control unit, the load on the rotor blade includes determining that the load exceeds a threshold load and wherein the method further includes:

in response to determining that the load exceeds the threshold load, selectively activating trailing, mid-chord and leading edge air deflectors on both the upper and lower surfaces of the rotor blade.

9. A rotor blade comprising:
an upper surface;
a lower surface; and
a plurality of selectively and independently deployable air deflectors located on at least one of the upper surface and the lower surface, wherein each of the deployable air deflectors is configured to extend from at least one of the upper surface and the lower surface when deployed.

10. The rotor blade of claim 9, wherein a first set of one or more selectively deployable air deflectors is located at a trailing edge of the rotor blade and a second set of one or more selectively deployable air deflectors is located at a mid-chord region of the rotor blade.

11. The rotor blade of claim 9, wherein the selectively deployable air deflectors are embedded in the rotor blade in an undeployed position and wherein the selective deployable air deflectors extend from the rotor blade in a deployed position.

12. The rotor blade of claim 9, wherein a first set of one or more selectively deployable air deflectors is located at a mid-chord region of the rotor blade and a second set of one or more selectively deployable air deflectors is located at a leading edge of the rotor blade.

13. The rotor blade of claim 9, further comprising a control module configured to control the deployment of the air deflectors.

14. The rotor blade of claim 13, wherein the control module is further configured to:
determine a load condition on the rotor blade;
determine whether to deploy one or more of the selectively deployable air deflectors based on the determined load condition; and
in response to determining to deploy one or more of the selectively deployable air deflectors, identifying a set of selectively deployable air deflectors to deploy based on the determined load condition.

15. The rotor blade of claim 14, wherein the load condition includes an asymmetric load and wherein the identified set of air deflectors includes a first set of air deflectors located on an upper surface trailing edge of the rotor blade and a second set of air deflectors located on a lower surface trailing edge of the rotor blade.

16. The rotor blade of claim 14, wherein the control module is further configured to determine a deployment height of the identified set of air deflectors.

17. The rotor blade of claim 9, wherein the rotor blade includes a first set of selectively deployable air deflectors located at a leading edge of the rotor blade, a second set of selectively deployable air deflectors located at a trailing edge of the rotor blade and a third set of selectively deployable air deflectors located at a mid-chord region of the rotor blade.

18. A method comprising:
identifying a set of one or more air deflectors to activate based on the determined load, wherein the set is identified from a plurality of air deflectors, wherein the plurality of air deflectors are configured to extend from a surface of a rotor blade when deployed; and
selectively activating the set of one or more air deflectors, wherein the set of one or more air deflectors is a proper subset of the plurality of air deflectors, wherein activating the set of one or more air deflectors includes extending the set of one or more air deflectors from an interior region of the rotor blade to above the surface of the rotor blade.

19. The method of claim 18, wherein identifying the set of one or more air deflectors is performed based on determining at least one of: a rotor torque and a rotor speed associated with the rotor blade.

20. The method of claim 18, wherein identifying the set of one or more air deflectors is performed based on determining a rotor thrust associated with the rotor blade.

* * * * *